United States Patent [19]

Muse

[11] Patent Number: 4,947,892

[45] Date of Patent: Aug. 14, 1990

[54] X-RAY SOLUTION MIXING MACHINE

[76] Inventor: John Muse, 5636 Dover St., Chino, Calif. 91710

[21] Appl. No.: 416,586

[22] Filed: Oct. 3, 1989

[51] Int. Cl.⁵ .............................................. F16K 21/18
[52] U.S. Cl. ................................. 137/624.11; 222/21; 222/639
[58] Field of Search ......................... 137/624.4, 624.18; 222/14, 16, 21, 638, 639

[56]     References Cited
    U.S. PATENT DOCUMENTS

| | | |
|---|---|---|
| 101,814 | 8/1870 | Black . |
| 440,100 | 11/1890 | Clapp . |
| 679,368 | 7/1901 | Denton . |
| 818,017 | 4/1906 | Denny et al. . |
| 962,959 | 6/1910 | Hout . |
| 1,848,176 | 3/1932 | Jernberg ................................ 222/21 |
| 2,209,219 | 7/1940 | Benson . |
| 2,982,309 | 5/1961 | Read . |
| 3,945,533 | 3/1976 | Otto ..................................... 222/639 |
| 4,405,061 | 7/1983 | Bergandy .............................. 222/21 |
| 4,651,907 | 3/1987 | Thomas ....................... 137/624.11 X |

Primary Examiner—John C. Fox
Attorney, Agent, or Firm—Denton L. Anderson

[57] ABSTRACT

An X-ray solution mixing machine is provided which operates automatically, is simple in design, has no electronic parts, does not require electricity, and produces accurate and reproducible results. The mixing machine employs a unique liquids metering device which is wholly mechanical in its operation. In one embodiment of the liquids metering device, a first valve is actuated which directs a flow of liquid to the base of a vertical hydraulic cylinder. The flow of liquids causes the piston within the hydraulic cylinder to rise to the top of the cylinder. At the top of the cylinder, linking means close the first valve and the piston begins a slow descent as liquid is expelled from the hydraulic cylinder via a bleed hole located in the cylinder base. The time in which it takes for the hydraulic piston to descend from the top of the hydraulic cylinder to the bottom of the hydraulic cylinder is easily controlled by sizing the capacity of the cylinder, the weight of the piston and the sizes of the bleed hole. A second valve uses the "mechanical clock" provided by the hydraulic cylinder to provide a measured quantity of liquids to a specified location. Additional linking means open the second valve when the piston is at the top of the hydraulic cylinder and close the second valve when the piston has fully descended to the bottom of the hydraulic cylinder.

15 Claims, 15 Drawing Sheets

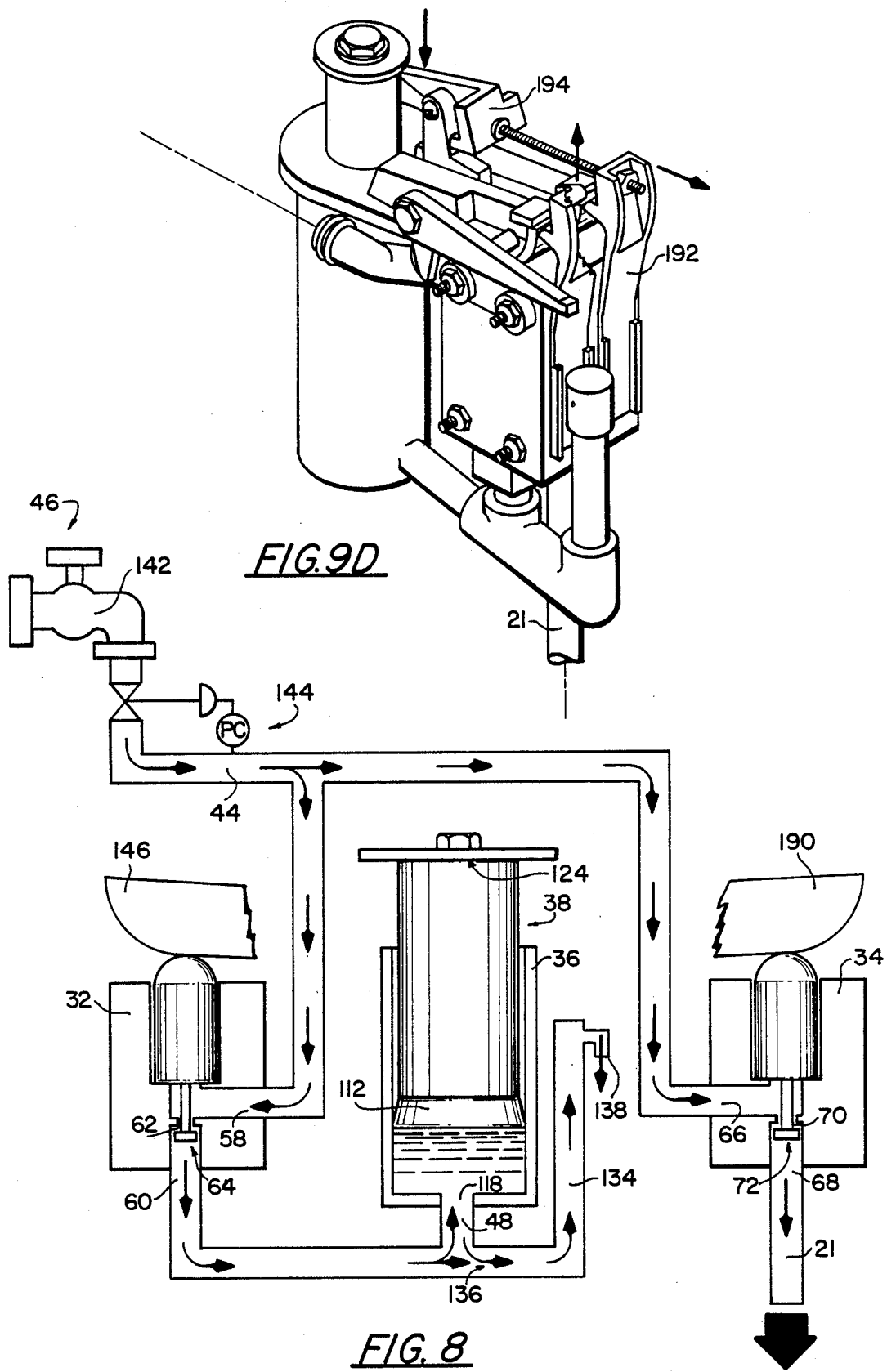

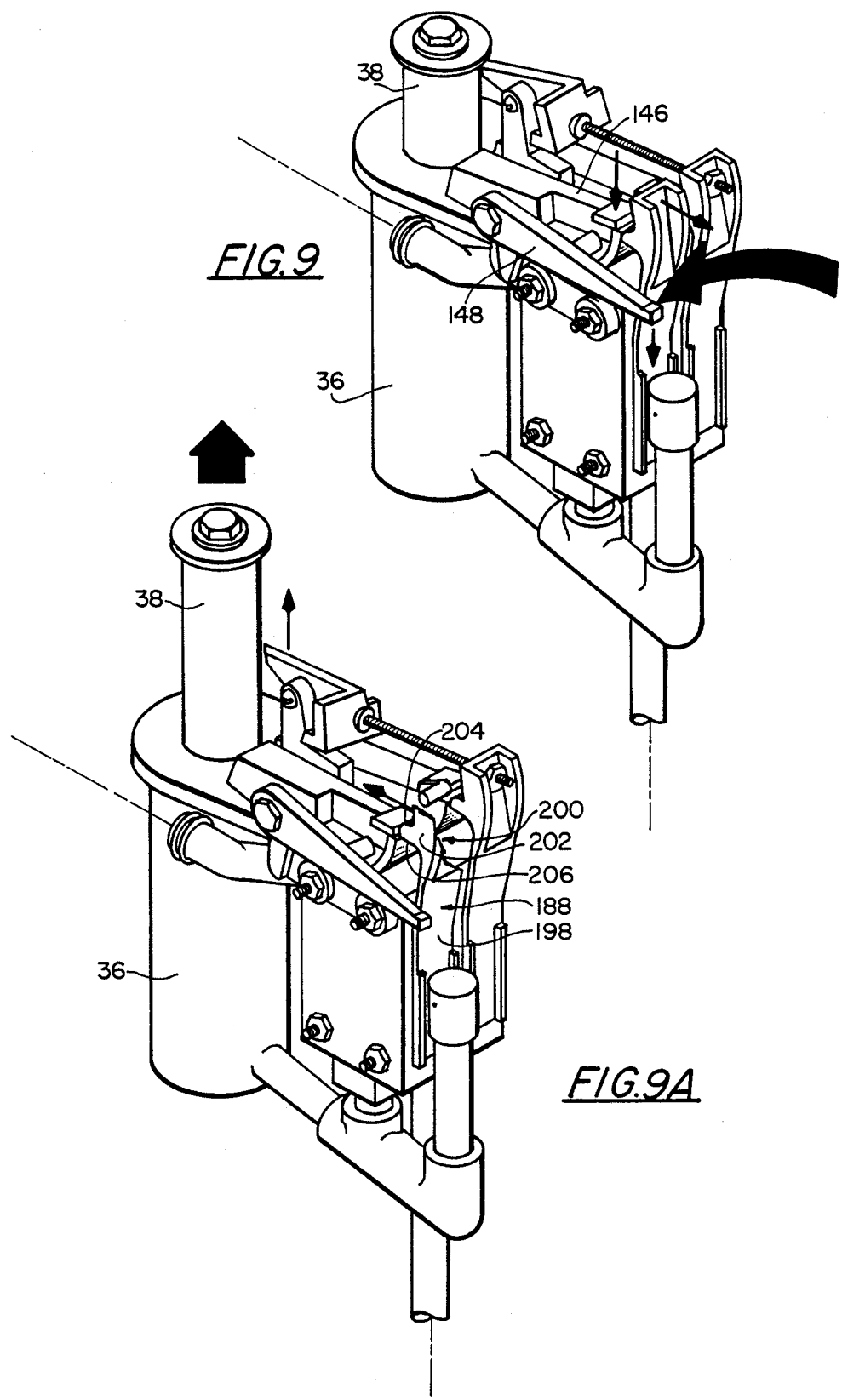

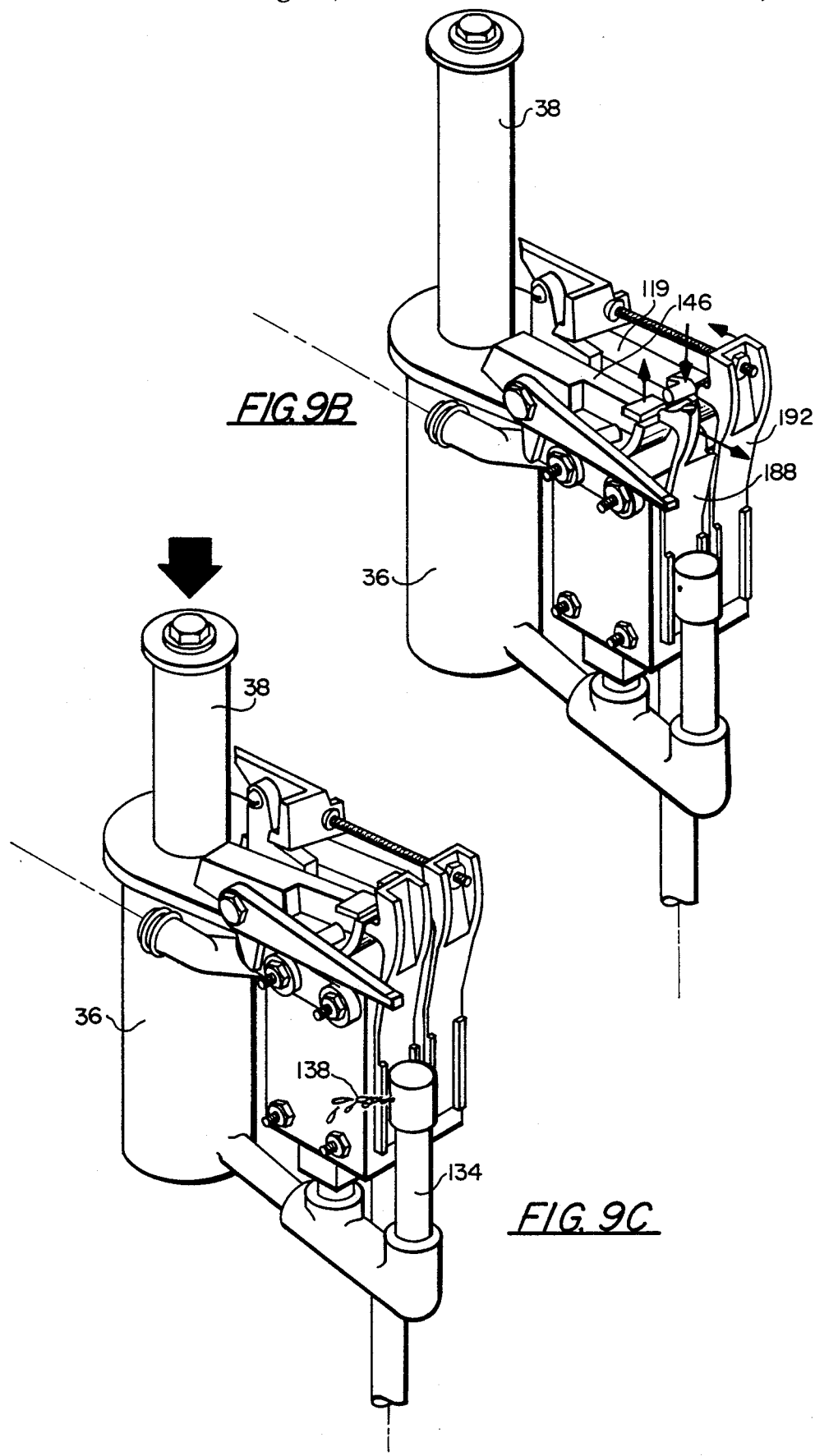

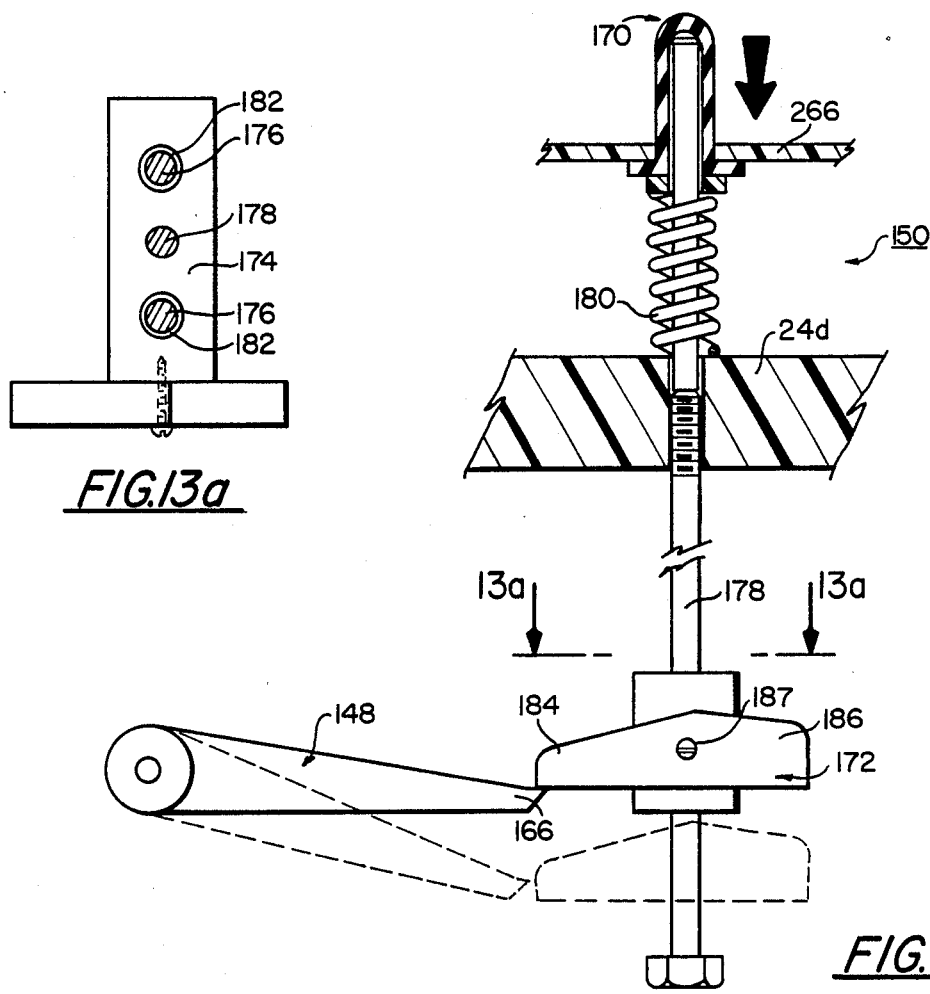
FIG.13a
FIG.13
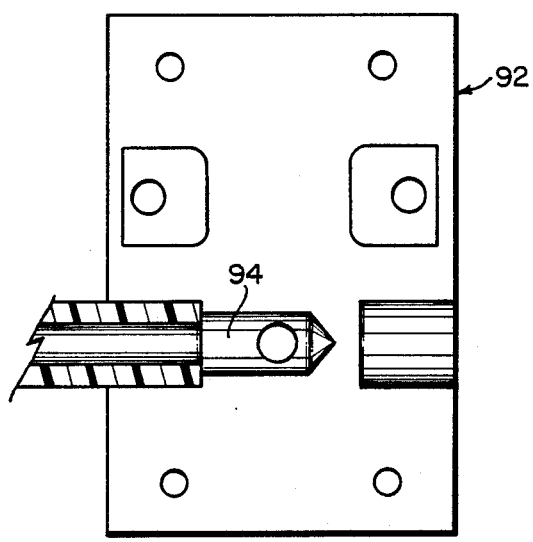
FIG.11

X-RAY SOLUTION MIXING MACHINE

FIELD OF THE INVENTION

This invention relates generally to the field of solution mixing apparatus and specifically to the field of automatic and semi-automatic x-ray solution mixing apparatus.

BACKGROUND OF THE INVENTION

Preparing solutions for the development of x-ray film requires the mixing of several different reactants with a precise quantity of tap water. Over the years, systems have been developed to assist x-ray development technicians in rapidly and accurately preparing x-ray solutions in an attempt to keep up with the heavy demands of modern hospital x-ray departments. In one of the most common systems, x-ray solution reactants are packaged in pre-measured quantities, so that the x-ray technician need only mix the various pre-measured reactants with a measured quantity of tap water.

Devices for automatically and semi-automatically metering out a precise quantity of tap water for mixing with pre-measured x-ray solution reactants have been created and are in common use in most large hospital x-ray departments. There are several problems, however, with these prior art metering devices. Most such devices are semi-automatic at best, requiring the x-ray technician to not only initiate the metering process but to reset the metering device after each cycle. Furthermore, the fully automatic prior art devices are almost exclusively controlled electronically. Electronic devices are expensive, technically complex, prone to corrosion and other maintenance problems and require close proximity to a source of electricity.

There is therefore a need in the field of x-ray solution preparation technology for an x-ray solution mixing machine which is accurate, cost effective and fully automatic, but does not rely upon electrical components.

SUMMARY OF THE INVENTION

The x-ray solution mixing machine of the invention solves this need.

The invention is an x-ray solution mixing machine which employs a unique liquids metering device. A first embodiment of the liquids metering device of the invention comprises (a) a first valve having a first valve inlet, a first valve outlet, and a first valve throat which connects the first valve inlet and the first valve outlet in fluid communication, the first valve also having a first valve closure means for alternatively opening and closing the first valve to liquid flow; (b) a second valve having a second valve inlet, a second valve outlet, and a second valve throat which connects the second valve inlet and the second valve outlet in fluid communication, the second valve also having a second valve closure means for alternatively opening and closing the second valve to liquid flow; (c) a vertical hydraulic cylinder having a cylinder base and cylinder sides, the cylinder also having a cylinder base opening disposed proximate to the cylinder base to allow liquids to flow into and out of the cylinder; (d) a hydraulic piston disposed within the hydraulic cylinder such that the hydraulic piston is capable of sliding up and down within the hydraulic cylinder between a lower-most piston position which is above the cylinder base opening and an upper-most piston position; (e) sealing means for preventing the escape of liquid from between the hydraulic piston and the walls of the cylinder; (f) bleed means for allowing a controlled rate of liquid flow out of the hydraulic cylinder; (g) first conduit means for connecting in fluid communication a source of liquids to the inlets of the first and second valves; (h) second conduit means for connecting in fluid communication the outlet side of the first valve to the cylinder base opening; (i) first valve manual opening means for opening the first valve when the hydraulic piston is proximate to the lower-most piston position; (j) first valve linking means for closing the first valve when the hydraulic piston is proximate to the upper-most piston position; (k) second valve first linking means for opening the second valve when the hydraulic piston is proximate to the upper-most piston position; and (1) second valve second linking means for closing the second valve when the hydraulic piston is proximate to the lower-most piston position. The bleed means is chosen so that, when the cylinder is filled with liquid with the piston in its upper-most position and the first valve is then closed to liquid flow, the weight of the piston evacuates the liquid from the cylinder in a controlled and reproducible time period.

A second embodiment of the liquids metering device of the invention comprises: (a) a valve having a valve inlet, a valve outlet, and a valve throat which connects the valve inlet and the valve outlet in fluid communication, the valve also having a valve closure means for alternatively opening and closing the valve to liquid flow; (b) a vertical hydraulic cylinder having a cylinder base and cylinder sides, the cylinder also having a cylinder base opening disposed proximate to the cylinder base to allow liquids to flow into and out of the cylinder; (c) a hydraulic piston disposed within the hydraulic cylinder such that the hydraulic piston is capable of sliding up and down within the hydraulic cylinder between a lower-most piston position which is above the cylinder base opening and an upper-most piston position; (d) sealing means for preventing the escape of liquid from between the hydraulic piston and the walls of the cylinder; (e) first conduit means for connecting in fluid communication a source of liquids to the valve inlet; (f) second conduit means for connecting in fluid communication the valve outlet to the cylinder base opening and to a target receptacle; (g) manual opening means for opening the valve when the hydraulic piston is proximate to the lower-most piston position; (h) linking means for closing the valve when the hydraulic piston is proximate to the upper-most piston position; and (i) flow restriction means for inhibiting the flow of liquids from the valve outlet to the cylinder; wherein the flow restriction means is chosen so that, when liquid is caused to flow through the valve and into the second conduit means, the piston is displaced by liquid from the lower-most position to the upper-most piston position in a controlled and reproducible time period.

The x-ray solution mixing machine of the invention comprises (a) a first tank having a base, vertical sides and a first tank top cover, the first tank top cover defining at least one first tank top cover opening for receiving a mixing solution container; (b) a second mixing tank having a base, vertical sides and a second tank top cover, the second tank top cover defining at least one second tank top cover opening for receiving a mixing solution container, the second tank top cover being disposed in substantially the same plane as the first tank top cover; (c) the liquids metering device discussed above; (d) diverter valve means for accepting a flow of liquid from the liquids metering device and directing such flow of liquid alternatively between the first mixing tank and the second mixing tank by the manipulation of a diverter valve handle; (e) metered liquid conduit means for connecting the liquids metering device second valve outlet in fluid communication to the diverter valve means; (f) a slide member slidably disposed in parallel with, and proximate to, the first tank top cover and the second tank top cover in such a way that the slide member is alternatively movable between (i) a first slide member position wherein the slide member prevents the insertion of a mixing solution container into the second tank via the second tank top cover opening and wherein the slide member does not prevent the insertion of a mixing solution container into the first tank via the first tank top cover opening and (ii) a second slide member position wherein the slide member prevents the insertion of a mixing solution container into the first tank via the first tank top cover opening and wherein the slide member does not prevent the insertion of a mixing solution container into the second tank via the second tank top cover opening; and (g) slide member linking means for connecting the slide member to the diverter valve handle in such a way that the moving of the slide member to the second slide member position manipulates the diverter valve handle to direct the flow of liquid to the first tank, and the moving of the slide member to the first slide member position manipulates the diverter valve handle to direct the flow of fluids to the second tank.

The x-ray solution mixing machine of the invention preferably employs a unique self-actuating valve. The self-actuating valve of the invention comprises (a) a chamber defining (i) an inlet opening, (ii) an outlet opening and (iii) an actuation tunnel opening, the outlet opening and the actuation tunnel opening being disposed on opposite sides of the chamber; (b) an actuation tunnel having an interior wall surface and disposed in fluid communication with the actuation tunnel opening; (c) an actuation tunnel plug slidably disposed within the actuation tunnel; (d) sealing means for preventing the flow of fluids between the actuation tunnel plug and the interior wall surface of the actuation tunnel; (e) an outlet opening plug disposed outside of the chamber proximate to the outlet opening and adapted to move between a closed valve position wherein the outlet opening plug seals the outlet opening and an open valve position wherein the outlet opening plug does not seal the outlet opening; (f) a linking pin for connecting the actuation tunnel plug with the outlet opening plug in such a way that when the actuation plug is moved away from the actuation tunnel opening, the outlet opening plug is moved toward the closed valve position, and when the actuation tunnel plug is moved toward the actuation tunnel opening, the outlet opening plug is moved away from the closed valve position; and (g) manipulating means for moving the actuation tunnel plug towards the actuation tunnel opening. The actuation tunnel plug has an internal cross-sectional area which is greater than the area of the outlet opening plug normal to the direction of fluid flow through the outlet opening, and the linking pin is long enough so that the outlet opening plug can move between the closed valve position and the open valve position and short enough so that fluid pressure within the chamber causes the outlet opening plug to move to the closed valve position.

The invention provides a precise and efficient method of mixing solutions for developing and fixing x-ray film without the necessity of electronic components and without the need for electric power. The unique liquids metering device of the invention provides an accurate, cost-effective, controllable and reproducible device for metering out a precise quantity of liquid. The liquids metering device is fully automatic in that, after initial actuation, the metering device completes the metering cycle and then resets itself ready for a new cycle.

DRAWINGS

These and other features, aspects and advantages of the present invention will become understood with reference to the following description, appended claims and accompanying drawings where:

FIG. 8 is a liquids flow diagram illustrating in diagrammatic form the flow of liquids through the liquids metering device of FIG. 5.

FIG. 9 is a perspective view of the liquids metering device of FIG. 5 illustrating the device in a first operating stage.

FIG. 9A is a perspective view of the liquids metering device of FIG. 5 illustrating the device in a second operating stage.

FIG. 9B is a perspective view of the liquids metering device of FIG. 5 illustrating the device in a third operating stage.

FIG. 9C is a perspective view of the liquids metering device of FIG. 5 illustrating the device in a fourth operating stage.

FIG. 9D is a perspective view of the liquids metering device of FIG. 5 illustrating the device in a fifth operating stage.

FIG. 11 is a reverse side view of the self-actuating valve of FIG. 10.

FIG. 13 is a detailed view of a trigger button assembly useful in the invention.

FIG. 13A is a cross-sectional view of the starter button assembly of claim 13 taken along plane 13A—13A.

DETAILED DESCRIPTION

Figure 10:
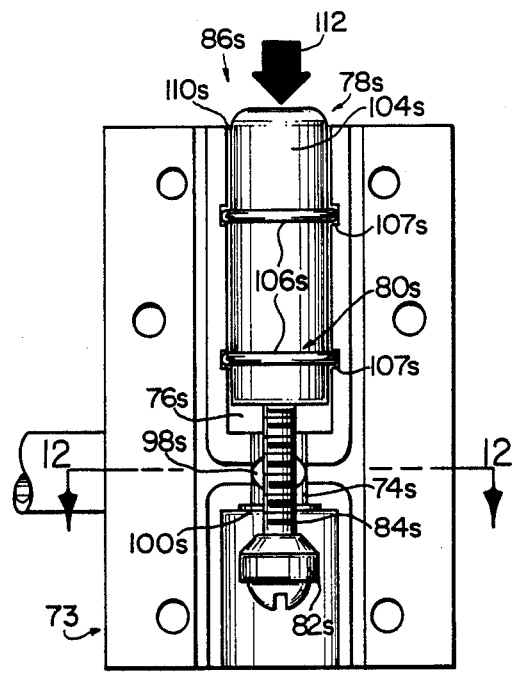
FIG. 10 is a cross-sectional view of a self-actuating valve having features of the invention.
Figure 12:
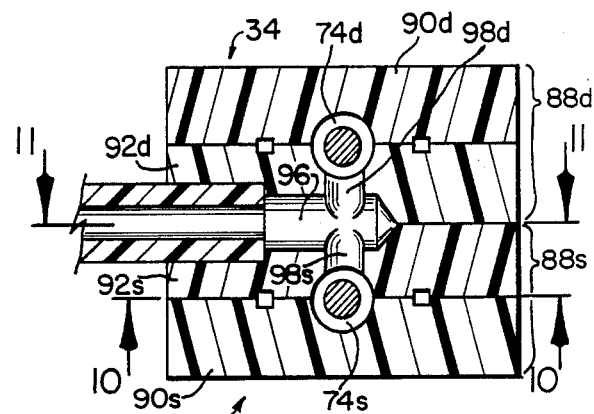
FIG. 12 is a cross-sectional top view of the self-actuating valve of FIG. 10 taken along plane 12—12.

The x-ray solution mixing apparatus of the invention 10 can comprise (a) a developer mixing tank 12, (b) a fixer mixing tank 14, (c) a liquids metering device 16, (d) diverter valve means 18 for accepting a predetermined quantity of liquid from the liquids metering device 16 and directing that liquid alternatively between the developer mixing tank 12 and the fixer mixing tank 14 by the manipulation of a diverter valve handle 20, (e) metered liquid conduit means 21 for attaching the liquids metering device 16 in fluid communication to the diverter valve means, (f) a slide member 22, and (g) slide member linking means for connecting the slide member 22 to the diverter valve handle 20.

In the embodiment illustrated in the drawings, the developer tank 12 and the fixer tank 14 are substantially identical. In the following discussion, the identical elements of the two tanks will be given an identical Arabic numeral followed by a "d" for developer tank 12 elements or an "f" for fixer tank 14 elements.

The mixing tanks 12 and 14 have a base 25, vertical sides 22, and a top cover 24. The mixing tanks 12 and 14 can be made of any suitable material which is fluid tight and resistant to chemical attack from the various mixing solution reactants. Typically both tanks 12 and 14 are made of a plastic material such as polyethylene.

Both the developer mixing tank 12 and the fixer mixing tank 14 should have sufficient capacity to hold all of the mixing solution reactants without danger of overflowing the reactants over the sides 22 during the mixing process. Where the liquids metering device 16 is physically located within one of the tanks 12 or 14, that tank should have sufficient capacity so that the mixing solution reactants will not rise high enough in the tank during operation to immerse the metering device 16.

Preferably, the mixing tanks 12 and 14 have fluid outlet conduits 26 for ease of discharging the contents of the tanks 12 and 14.

The tank top covers 24 define at least one tank top cover opening 28 for receiving a mixing reactant container 30 having a pre-measured quantity of a specific x-ray solution reactant. In the embodiment illustrated in the drawings, the tank top cover 24d has three tank top cover openings 28d and the fixer tank top cover 24f has two tank top cover openings 28f. Each tank top opening has a particular size and shape so as to accept a very specific mixing solution container 30.

Figure 3:
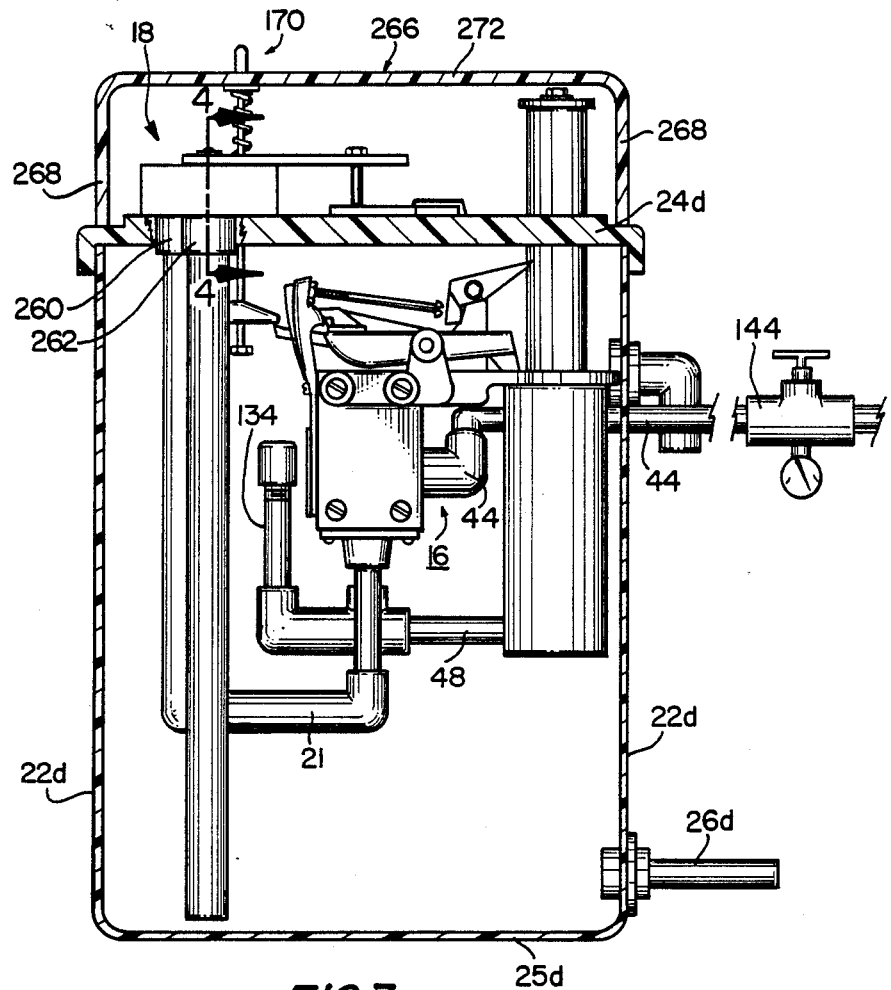
FIG. 3 is a cross-sectional side view of the x-ray solution mixing machine of FIG. 1 taken along plane 3—3.
Figure 4:
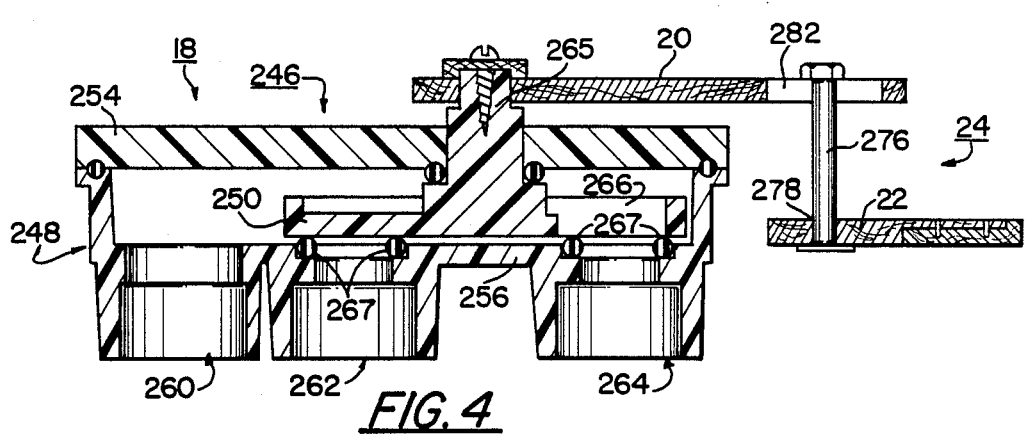
FIG. 4 is a cross-sectional view of a diverter valve and slide member useful in the invention.
Figure 5:
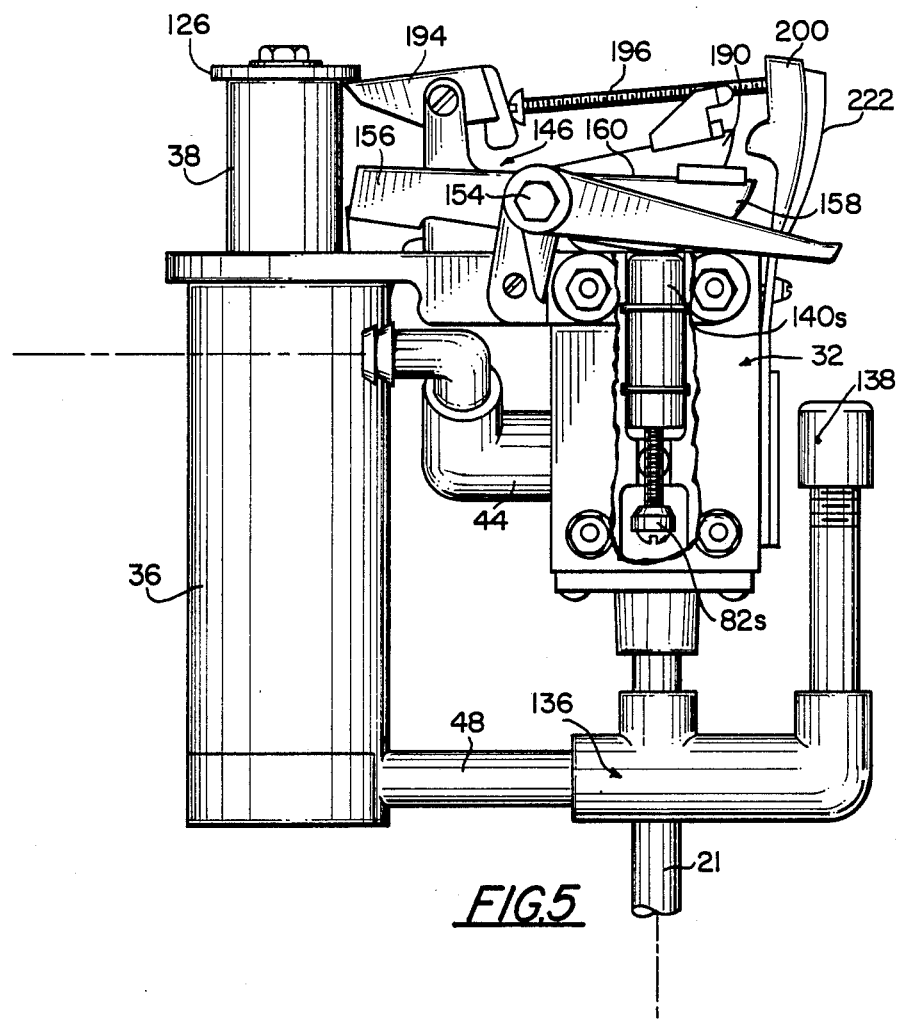
FIG. 5 is a side view of a liquids metering device having features of the invention. The side view is in partial cross-section showing internal elements of a self-actuating valve useful in the invention.
Figure 7:
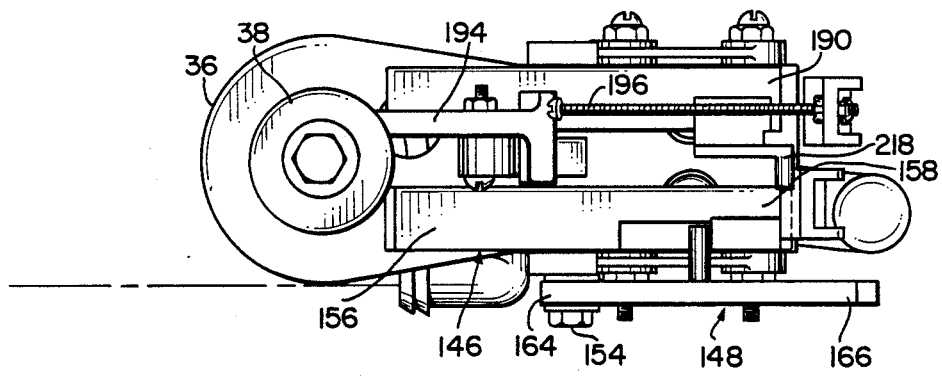
FIG. 7 is a top view of the liquids metering device of FIG. 5.

One or two liquids metering devices 16 are disposed proximate to the two tanks 12 and 14. In one embodiment, a single liquids metering device 16 is attached within and near the top of one of the two tanks 12 or 14 as shown in FIG. 3. In an alternative embodiment shown diagrammatically in FIG. 25, two liquids metering devices 16 are employed, one disposed in each tank 12 and 14.

In a first embodiment illustrated in FIGS. 3–17, the liquids metering device 16 comprises (a) a starter valve 32, (b) a delivery valve 34, (c) a hydraulic cylinder 36, (d) a hydraulic piston 38, (e) sealing means 40 for preventing the escape of liquid between the piston 38 and the walls of the hydraulic cylinder 36, (f) bleed means 42, (g) first conduit means 44 for connecting the inlet sides of the starter valve 32 and the delivery valve 34 to a source of water 46, (h) second conduit means 48 for connecting the outlet side of the starter valve 32 to the hydraulic cylinder 36, (i) starter valve manual opening means for opening the starter valve 32 when the base of the hydraulic piston 38 is proximate to the base of the hydraulic cylinder 36, (j) starter valve linking means 52 for closing the starter valve 32 when the base of the piston 38 is proximate to the upper-most portion of the cylinder 36, (k) delivery valve first linking means 54 for opening the delivery valve 34 when the base of the hydraulic piston 38 is proximate to the upper-most portion of the hydraulic cylinder 36, and (1) delivery valve second linking means 56 for closing the delivery valve 34 when the base of the hydraulic piston 38 is proximate to the base of the hydraulic cylinder 36.

The starter valve 32 has a starter valve inlet 58, a starter valve outlet 60 and a starter valve throat 62 which connects the starter valve inlet 58 and the starter valve outlet 60 in fluid communication. The starter valve 32 also has a starter valve closure means 64 for alternatively opening and closing the starter valve 32 to liquid flow (i.e., liquid flow from the starter valve inlet 58 through the starter valve throat 62 and then through the starter valve outlet 60).

Similarly, the delivery valve 34 has a delivery valve inlet 66, a delivery valve outlet 68 and a delivery valve throat 70 which connects the delivery valve inlet 66 and the delivery valve outlet 68 in fluid communication.

The delivery valve 34 also has a delivery valve closure means 72 for alternatively opening and closing the delivery valve 34 to liquid flow.

Preferably, the starter valve 32 and the delivery valve 34 are identical, self-actuating valves 73 of the type illustrated in the drawings and described in detail below. Such self-actuating valves are simple and inexpensive to construct and to operate, virtually maintenance-free, and are self-actuating in the sense that they are self-closing and will remain normally closed during operation.

In the embodiments shown in the drawings, the starter valve 32 and the delivery valve 34 are identical self-actuating valves 73. In the following discussion, those elements of the starter valve 32 are designated with an Arabic numeral and a "s." Corresponding elements of the delivery valve 34 are designated with an identical Arabic numeral followed by a "d."

In the embodiments illustrated in the drawings, both the starter valve 32 and the delivery valve 34 comprise (a) a chamber 74, (b) an actuation tunnel 76, (c) an actuation tunnel plug 78, (d) sealing means 80 for preventing the flow of liquids between the actuation tunnel plug 78 and the interior walls of the actuation tunnel 76, (e) an outlet opening plug 82, (f) a linking pin 84 for connecting the actuation tunnel plug 78 to the outlet opening plug 82, and (g) manipulating means 86 for moving the actuation tunnel plug 78 towards the chamber 74.

In the embodiments illustrated in the drawings, the starter valve 32 and the delivery valve 34 comprise back to back valve bodies 88 each of which is shaped to define the chamber 74 and the actuation tunnel 76. Each valve 32 and 34 is comprised of an exterior valve body moiety 90 and an interior valve body moiety 92. The two interior valve body moieties 92 define corresponding grooves 94 each groove 94 having an identical semi-circular cross-section. Each groove is defined within the respective interior valve body moiety 92 so that, when the two interior valve body moieties are attached back-to-back, the grooves 94 combine to form a single hollow conduit 96 with a circular cross-section. The inlet opening (described below) of each valve 32 and 34 is defined within the respective interior valve body moiety 92 so that the inlet opening 98 (described below) is normal to and intersects with the semi-circular groove 94. Therefore, when the two interior valve body moieties 92 are attached back-to-back, the inlet openings 98 of both valves 32 and 34 are in fluid communication with the hollow conduit 96 formed by the two grooves 94.

The valve body 88 can be of any suitable material. Typically, the valve body material is a plastic since a plastic valve body 88 can be easily and inexpensively manufactured in a molding process.

The chamber 74 defines an inlet opening 98, an outlet opening 100 and an actuation tunnel opening 102. The actuation tunnel opening 102 is disposed opposite the outlet opening 100. The actuation tunnel 76 is in fluid communication with the chamber 74 via the actuation tunnel opening 102.

In the embodiment illustrated in the drawings, the actuation tunnel plug 78 is a solid, cylindrically-shaped actuation tunnel piston 104 having an external diameter only slightly smaller than the internal diameter of the actuation tunnel 76 so that the actuation tunnel piston 104 can slide back and forth within the actuation tunnel 76. In a typical embodiment, the diameter of the actuation tunnel 76 is between about 0.5 and about 0.8 inches.

The sealing means 80 for preventing the flow of liquids between the actuation tunnel plug 78 and the interior walls of the actuation tunnel 76 is typically provided by one or more 0-rings 106 disposed around the circumference of the actuation tunnel piston 104. In the embodiment illustrated in the drawings, the 0-rings 106 are disposed in grooves 107 defined in the interior walls of actuation tunnel 76.

The outlet opening plug 82 is disposed outside of the chamber 74 proximate to the outlet opening 100 and is adapted to move between a closed valve position wherein the outlet opening plug 82 seals the outlet opening 100 (thereby preventing liquid from flowing out of the chamber 74) and an open valve position wherein the outlet opening plug 82 does not seal the outlet opening 100 (thereby allowing liquid to flow out of the chamber 74).

Typically, the outlet opening plug 82 is comprised of a resilient material such as a rubber or resilient plastic and is shaped to closely conform to the shape of the outlet opening 100. This facilitates the ability of the outlet opening plug 82 to seal the outlet opening 100. Also in a typical embodiment, the diameter of the outlet opening plug 82 in a direction normal to flow through the outlet opening 100 is between about 0.2 and about 0.5 inches. Also, in a typical embodiment, the ratio of the cross-sectional area of the actuation tunnel 76 to the area of the outlet opening plug 82 in a direction normal to flow through the outlet opening 100 is between about 2:1 and about 4:1.

The linking pin 84 is a generally linear element adapted to connect the actuation tunnel plug 78 and the outlet opening plug 82 in such a way that when the actuation tunnel plug 78 is moved away from the actuation tunnel opening 102, the outlet opening plug 82 is moved towards the closed valve position and when the actuation tunnel plug 78 is moved toward the actuation tunnel opening 102, the outlet opening plug 82 is moved away from the closed valve position. In a typical embodiment, the linking pin 84 is between about ½ inch and about 2 inches long.

The actuation tunnel plug 78 has a cross-sectional area which is larger than the area of the outlet opening plug 82 normal to the direction of liquid flow through the outlet opening 100. This difference in areas causes the self-actuating valve 73 to be normally closed because pressure from liquids within the chamber 74 exerts a greater force upon the actuation tunnel plug 78 (because of the greater effective area of the actuation tunnel plug 78 than that of the outlet opening plug 82 normal to the direction of fluid flow through the outlet opening 100.) In operation, therefore, the actuation tunnel plug 78 is displaced by the differential pressure forces away from the actuation tunnel opening 102, causing the outlet opening plug 82 to be drawn into contact with the outlet opening 100 so as to prevent liquid flow through the outlet opening 100.

Preferably, the actuation tunnel 76 communicates with the exterior of the self-actuating valve 73. This eliminates any back pressure forces operating on the actuation tunnel plug 104 to resist the movement of the actuation tunnel plug 78 away from the actuation tunnel opening 102. In the embodiment illustrated in the drawings, the actuation tunnel 76 is open to the exterior of the self-actuating valve 73 via an actuation tunnel valve body opening 110. The actuation tunnel piston 104 is long enough so that, when the outlet opening plug 82 is in the open valve position, a portion of the actuation tunnel piston 104 protrudes out of the actuation tunnel valve body opening 110 (or is at least even with the actuation tunnel valve body opening 110).

Thus, in the embodiment illustrated in the drawings, the manipulating means 86 for moving the actuation tunnel plug 78 towards the actuation tunnel opening 102 is provided by the end of the actuation tunnel piston 104 least proximate to the actuation tunnel opening 102. This end of the actuation tunnel piston 104, being exposed via the actuation tunnel valve body opening 110, can be manipulated by a mechanical force 112 from a force means disposed external to the valve body 88. When such mechanical force 112 is applied to the actuation tunnel piston 104, the actuation tunnel piston 104 is pushed downwardly towards the actuation tunnel opening 102. In this way, the outlet opening plug 82 is slid away from the outlet opening 100 to the open valve position (wherein the outlet opening plug 82 does not seal the outlet opening 100) and liquid is allowed to flow out of the chamber 74. It should be emphasized that the manipulating means 86 for moving the actuation tunnel plug 78 towards the actuation tunnel opening 102 need not take the form of the manipulating means 86 used in the embodiment illustrated in the drawings. Other manipulating means 86 are possible, including other mechanical linkages and magnetically-actuated systems.

In the embodiment illustrated in the drawings, the combination of the outlet opening plug 82, the actuation tunnel opening plug 78, the actuation tunnel opening plug 78, and the linking pin 84 act as the closure means 64 for alternatively opening and closing the starter valve 32 to liquid flow and the closure means 72 for alternatively opening and closing the delivery valve 34 to liquid flow.

The hydraulic cylinder 36 has a cylinder base 114, cylinder sides 116 and a cylinder base opening 118. The cylinder base opening 118 may be disposed either in the cylinder base 114 or in the cylinder sides 116 proximate to the cylinder base.

The cylinder 36 can be constructed of any suitable material. Various metals and plastics can conveniently be used. The interior walls of the cylinder 120 should be smooth to facilitate the operation of the hydraulic piston 38.

In a typical embodiment, the internal diameter of the hydraulic cylinder 120 is between about 1 and about 3 inches and the length of the hydraulic cylinder 120 is between about 3 and about 7 inches.

The hydraulic piston 38 has a base 122 and a top 124. The piston 38 is disposed within the hydraulic cylinder 36 such that the piston 38 is capable of sliding up and down within the hydraulic cylinder 36 between a lower-most piston position and an upper-most piston position.

In the embodiment illustrated in the drawings, the piston further comprises a top knot 126 which is a flange element disposed at the top 124 of the piston 38 having an outside diameter slightly larger than the outside diameter of the piston 38 itself.

Also in the embodiment illustrated in the drawing, the piston 38 further comprises (i) a piston cup 128 disposed near the base 114 of the piston 38 which provides a sealing means for preventing the escape of fluids from between the hydraulic piston 38 and the walls 116 of the hydraulic cylinder 36, (ii) a piston cup backer 130 disposed above the piston cup 128 which is a flange element having an external diameter slightly greater than the external diameter of the piston 38, and (iii) a piston cup retainer 132 which is disposed at the lowermost portion of the piston 38 to attach the piston cup 128 to the base 122 of the piston. The piston cup 128 is disposed around the piston 38 so that the piston cup 122 is above the cylinder base opening 118 when the piston 38 is in the lower-most piston position.

The diameter of the cup 128 is only slightly less than the internal diameter of the hydraulic cylinder 36. It is important that the piston 36 be carefully sized to smoothly slide up and down within the hydraulic cylinder 38 under pressure from liquids injected proximate to the base 114 of the cylinder 36 below the piston cup 128 (via the cylinder base opening 118). Also, it is important that the sides of the piston 38 are smooth to facilitate the sliding movement of the piston 38 within the cylinder 36.

It is important in the invention for the piston 38 to have a weight which is chosen to appropriately influence the flow of liquids either into or out of the cylinder 36 (depending upon the configuration of the liquids metering device 16) via the cylinder base opening 118 in a controlled and reproducible manner. In a typical embodiment, the piston 38 is between about 25 and 50 ounces in weight and between about 5 and about 9 inches in length.

The bleed means 42 for allowing liquid to flow out of the hydraulic cylinder 36 can be any system adapted to allow fluid to flow out of the hydraulic cylinder 36 at a small, controlled rate under the weight of the hydraulic piston 38. In the embodiment illustrated in the drawings, the bleed means 42 comprises a bleed pipe 134. The bleed pipe 134 has an inlet port 136 and an outlet port 138, with the outlet port 138 being substantially smaller than the inlet port 136. In a typical embodiment the outlet port 138 has a diameter between about 1/32 and about ⅛ inches.

Figure 17:
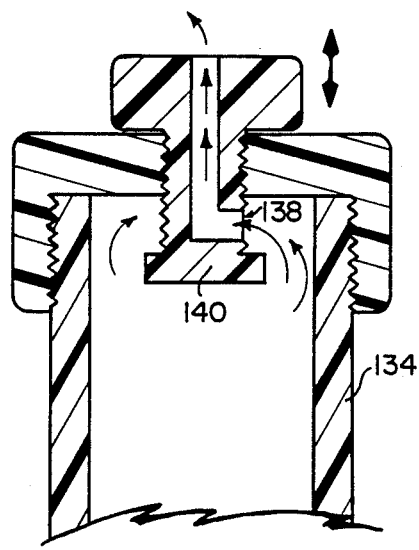
FIG. 17 is a cross-sectional view of an adjustable bleed pipe outlet port useful in the invention.
Figure 18:
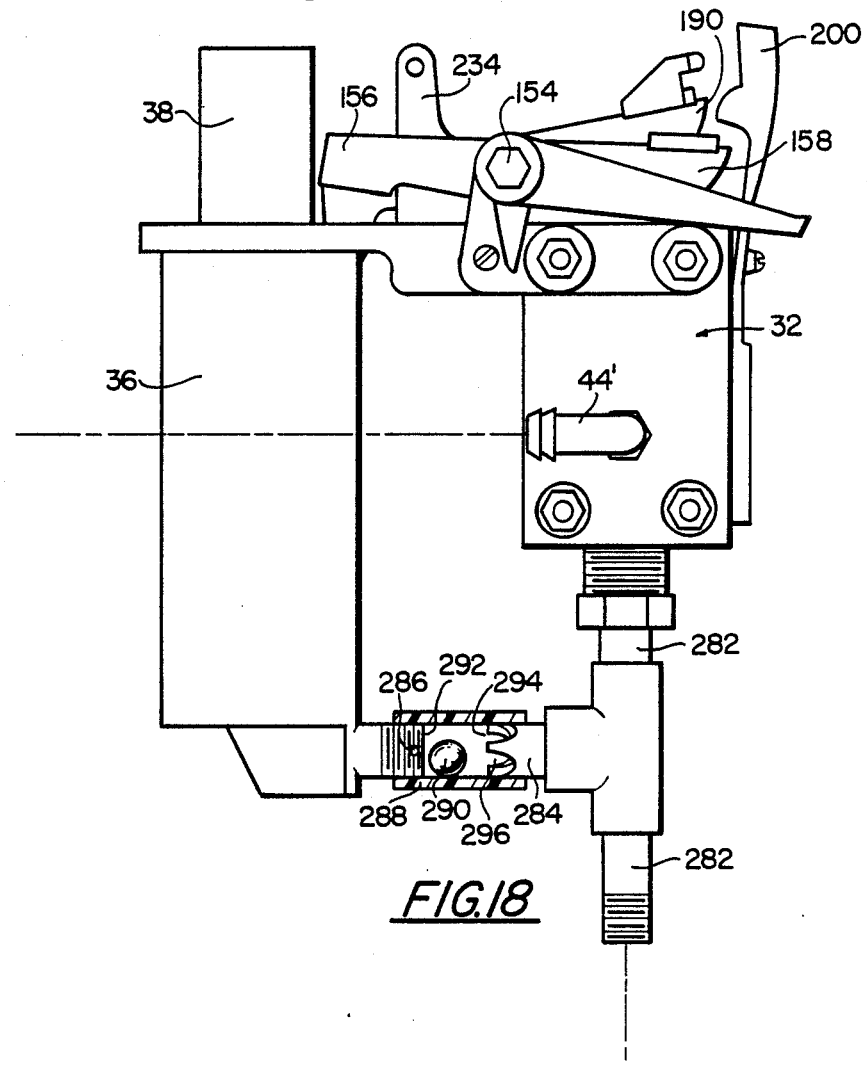
FIG. 18 is a side view of a second liquids metering device having features of the invention. The check valve is shown in cross-section.
Figure 19:
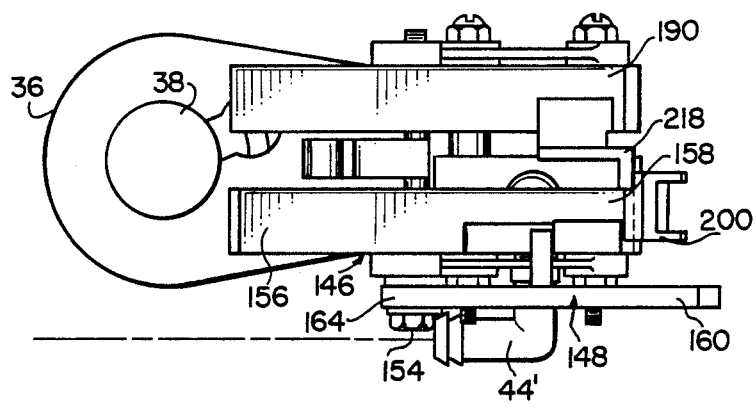
FIG. 19 is a top view of the liquids metering device of FIG. 18.
Figure 20:
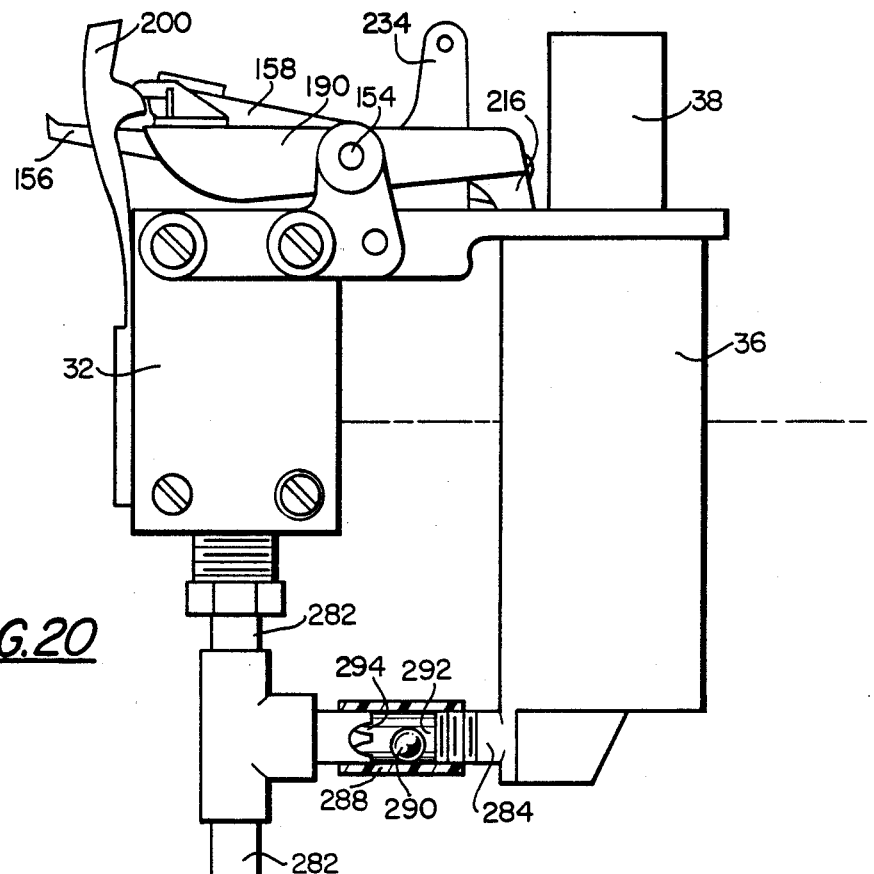
FIG. 20 is an opposite side view of the liquids metering device of FIG. 18. The check valve is again shown in cross-section
Figure 21:
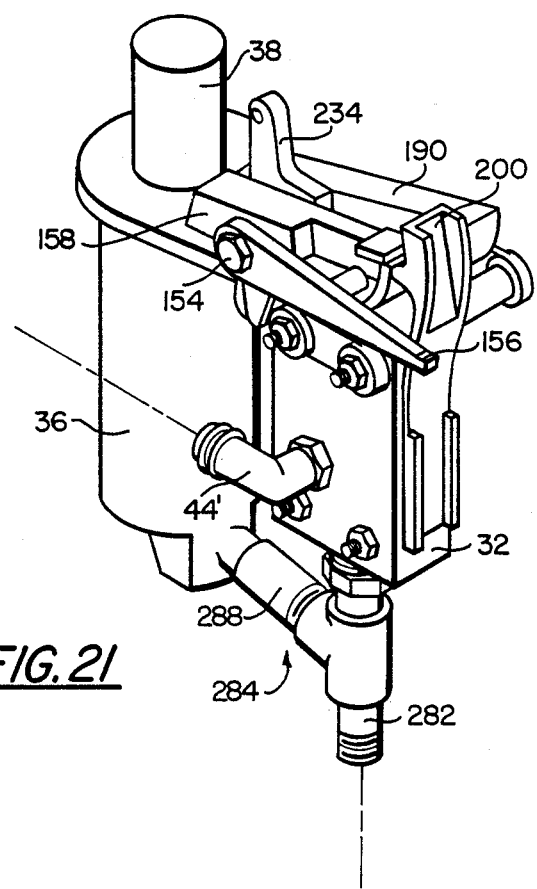
FIG. 21 is a perspective view of the liquids metering device of FIG. 18.
Figure 22:
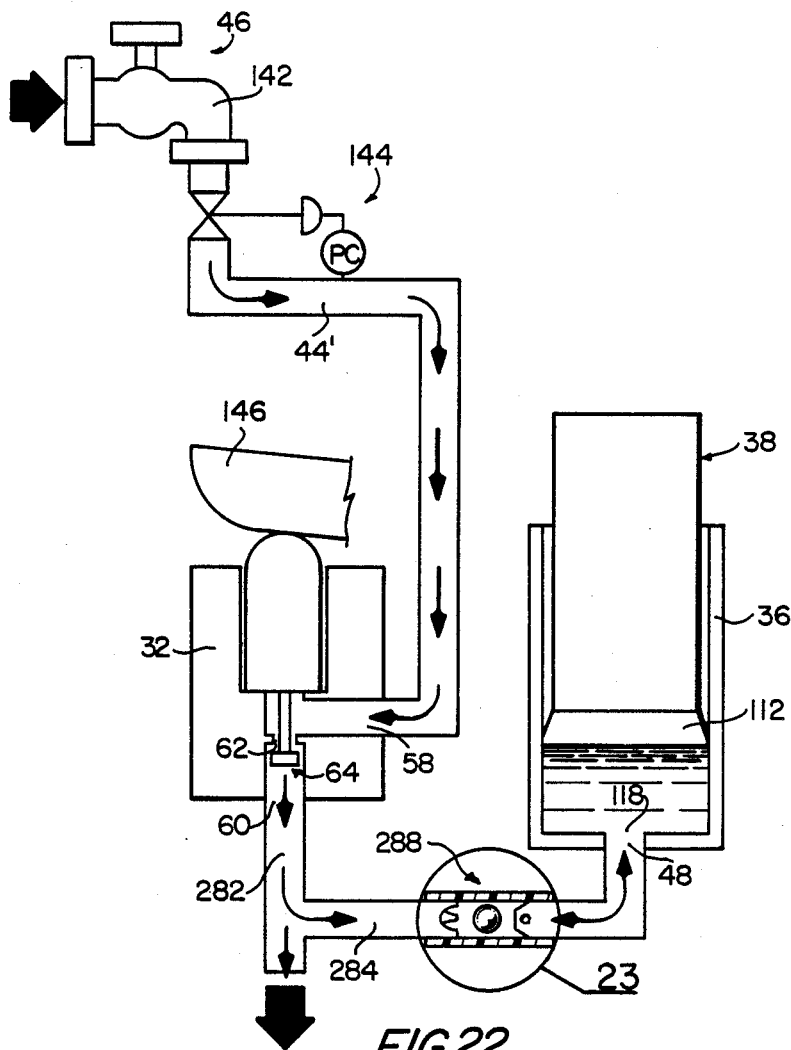
FIG. 22 is a liquids flow diagram illustrating in diagrammatic form the flow of liquids through the liquids metering device of FIG. 18.
Figure 23A:
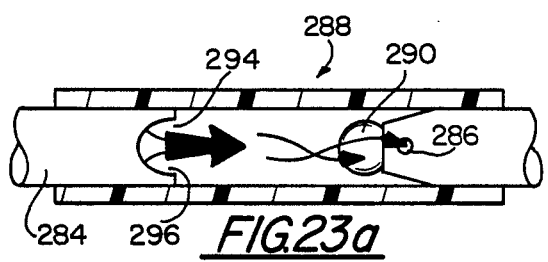
FIG. 23a is a detailed cross-sectional view of a check valve useful in the invention illustrating the restricted flow of liquids in the direction towards the hydraulic cylinder.
Figure 23B:
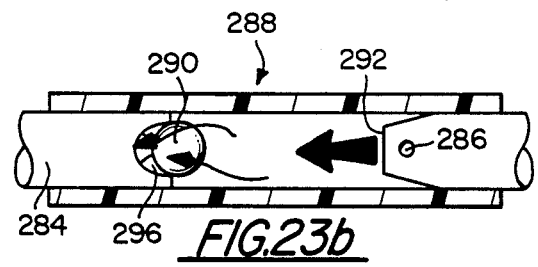
FIG. 23b is a second detailed cross-sectional view of the check valve of FIG. 23a illustrating the relatively unrestricted flow of liquids in the direction away from the hydraulic cylinder.

The inlet port 136 of the bleed pipe 134 is connected in fluid communication with the cylinder base opening 118 via the second conduit means 48. Other bleed means 42 embodiments can be used. For example, a bleed pipe can be used which has an inlet port and an outlet port of substantially the same diameter, but further comprises a flow restriction means, such as a restriction orifice disposed within the bleed pipe. Also, the bleed means 42 can simply comprise a second opening in the hydraulic cylinder proximate to the cylinder base. In the embodiment of the invention illustrated in the drawings, the effective area of the outlet port 138 can be made adjustable by, for example, use of an adjustable bleed orifice restriction plug 140 as illustrated in FIG. 17. Such restriction plug 140 is disposed proximate to the outlet port 138 and can be moved closer to or farther away from the outlet port 138 to decrease or increase the effective outlet port area.

The first conduit means 44 for connecting the inlets of the starter valve 32 and the delivery valve 34 to a source of liquids 46, such as a hose bib water tap connection 142, can be any suitable type of conduit, such as pipe, tubing or hose. Preferably, the first conduit means 44 comprises a pressure regulator 144 to maintain the fluid pressure immediately upstream of the starter valve 32 and the delivery valve 34 at a constant value. Fluid pressures immediately upstream of the starter valve 32 and delivery valve 34 of 10–20 psig can be conveniently used in the invention.

The second conduit means 48 for connecting the outlet side of the starter valve 32 to the cylinder base opening 118 can also be any suitable type of conduit such as pipe, tubing or hose. As indicated above, in the embodiment illustrated in the drawings, the second conduit means 48 also serves as part of the bleed means by placing the cylinder base opening 118 in fluid communication with the inlet port 136 of the bleed pipe.

The starter valve manual opening means for opening the starter valve 32 when the base of the hydraulic piston 38 is proximate to the lower-most piston position is provided in the embodiment illustrated in the drawings by a starter rocker arm 146, a trigger arm 148 and a starter button assembly 150.

The starter rocker arm 146 is pivotably affixed proximate to the starter valve 32 by attachment to a bridge body bracket 152 which is affixed to the delivery valve 34. The starter rocker arm 146 is adapted to pivot in a vertical plane about a rocker arm pivot 154.

The starter rocker arm 146 has a first end 156, a second end 158, an upper-most surface 160 and a lower-most surface 162. The starter rocker arm 146 is disposed immediately above the starter valve actuation tunnel valve body opening 110s such that the lower-most surface 162 of the second end 158 of the starter rocker arm 146 rests upon the upper-most portion of the starter valve actuation tunnel piston 140s and such that the second end 158 of the starter rocker arm 146 can be pivoted downwardly to urge the starter valve actuation tunnel piston 140s towards the starter valve actuation tunnel opening 102s. Thus, by depressing the second end 158 of the starter rocker arm 146, the outlet opening plug 82s of the starter valve 32 is moved from the first valve position (wherein the outlet plug 82s blocks liquid flow through the starter valve 32) to the second valve position (wherein liquid is allowed to flow through the starter valve 32).

The trigger arm 148 is pivotably affixed proximate to the starter rocker arm 146 by attachment to the bridge body bracket 152. The trigger arm 148 is adapted to pivot about the rocker arm pivot 154 in a vertical plane parallel to the vertical plane through which the starter rocker arm 146 pivots.

The trigger arm 148 has a first end 164 and a second end 166. The second end 166 of the trigger arm 148 comprises a trigger arm flange 168 which is disposed normal to the vertical plane through which the trigger arm 148 pivots. The trigger arm 148 is disposed proximate to the starter rocker arm 148 such that the trigger arm flange 168 rests upon an upper-most surface 160 of the starter rocker arm 146 and such that the second end 166 of the trigger arm 148 can be pivoted downwardly to urge the second end 158 of the starter rocker arm 146 to pivot downwardly.

The starter button assembly 150 comprises a starter button 170, a trigger 172, a trigger slide 174, two slide bolts 176, a fixed center bolt 178 and a starter button spring 180.

The starter button 170 is disposed at the upper-most portion of the center bolt 178. The center bolt 178 is slidably attached proximate to the starter valve 32 in a vertical orientation in such a way that depressing the starter button 170 depresses the center bolt 178.

The trigger slide 174 is rigidly attached near the base of the center bolt 178. The trigger slide 174 is adapted to slide upwardly and downwardly along the two slide bolts 176. The two slide bolts 176 are rigidly affixed to one of the tank covers 24 in parallel with the center bolt 178. The trigger slide 174 is slidably attached to the slide bolts 176 via slide bolt openings 182 disposed in the trigger slide 174.

The trigger 172 has a first end 184 and a second end 186. The trigger 172 is affixed to the trigger slide 174 by trigger pivot 187 in such a way that as the trigger slide 174 is moved downwardly, the first end 184 of the trigger 172 engages a top surface of the second end 166 of the trigger arm 148 and pivots the second end 166 of the trigger arm 148 downwardly. The trigger 172 is partially pivotable about the trigger pivot 187 between a first trigger pivot position wherein the trigger 172 is substantially horizontal and a second trigger pivot position wherein the trigger 172 assumes a more vertical position with the end of the trigger 172 which is most proximate to the trigger arm 148 at the bottom. The trigger 172 is disposed about the trigger pivot 187 in such a way that the trigger 172 is urged by gravity to the first trigger pivot position.

Preferably, the trigger 172 is disposed relative to the trigger arm 148 in such a way that after the downward movement of the trigger 172 pivots the second end 166 of the trigger arm 148 (so as to downwardly pivot the second end 158 of the starter rocker arm 146), the trigger arm 148 pivots out of contact with the trigger 172, as illustrated in FIG. 13. This allows the trigger arm 148 to return to its original (horizontal) position and prevents an operator from causing a malfunction of the liquids metering device 16 by continuing to hold down the starter button 170. Because the trigger 172 is pivotable about trigger pivot 187, the trigger 172 can easily return upwardly past the trigger arm 148 by pivoting to the second trigger pivot position.

The starter button spring 180 is disposed within the starter button assembly 150 in such a way that the trigger 172 is urged upwardly to an elevation higher than the second end 166 of the trigger arm 148 when the second end 158 f the starter rocker arm 146 is not engaged beneath the lip 202 on the starter rocker arm latch (described below). In the embodiment illustrated in FIG. 13, the starter button spring 180 is a coiled spring disposed around the center bolt 178 in such a way that it impinges at its one end against the underside of the starter button 170 and at its opposite end against the developer tank top cover 24d.

In the embodiment illustrated in the drawings, the elements of the invention previously identified as (i) the starter valve linking means 52 for closing the starter valve 32 when the base of the piston 38 is proximate to the upper-most portion of the cylinder 36, (ii) the delivery valve first linking means 54 for opening the delivery valve 34 when the base of the piston 38 is proximate to the upper-most portion of the cylinder 36, and (iii) the delivery valve second linking means 56 for closing the delivery valve 34 when the base of the hydraulic piston 38 is proximate to the base 114 of the hydraulic cylinder 36 are provided by the starter rocker arm 46, a starter rocker arm latch 188, a delivery rocker arm 19, a delivery rocker arm latch 192, a release lever 194 and a release lever pin 196.

The starter rocker arm latch 188 has a lower latch body 198 and an upper latch body 200. The lower latch body 198 is rigidly attached to the starter valve 32. The upper latch body 200 has a lip 202. The lip 202 has an upper-most surface 204 and a lower-most surface 206. The lower-most surface 206 of the lip 202 is adapted to engage the upper-most surface 160 of the second end 158 of the starter rocker arm 146 (to prevent the second end 158 of the starter rocker arm 146 from pivoting upwardly). The upper body 200 of the starter rocker arm latch 188 has sufficient resiliency to allow it to be pushed away from the starter rocker arm 146 to such an extent that the second end 158 of the starter rocker arm 146 clears the lip 202 on the upper latch body 200 of the starter rocker arm latch 188. The upper-most surface 204 of the starter rocker arm latch lip 202 and the lower-most surface 162 of the starter rocker arm second end 158 are configured with rounded corners so that the downward movement of the starter rocker arm second end 158 is not prohibited by the lip 202 on the starter rocker arm latch 188.

The delivery rocker arm 190 is pivotably affixed proximate to the delivery valve 34 by attachment to the bridge body bracket 152. The delivery rocker arm 190 is adapted to pivot about the rocker arm pivot 154 in a vertical plane parallel to the parallel planes through which the starter rocker arm 146 and the trigger arm 148 pivot.

The delivery rocker arm 190 has a first end 208, a second end 210, an upper-most surface 212 and a lower-most surface 214. The first end 208 of the delivery rocker arm comprises a downwardly directed element 216 which is disposed in the vertical plane through which the delivery rocker arm 190 pivots. The second end 208 of the delivery rocker arm 190 comprises a delivery rocker arm flange 218 which is disposed normal to the vertical plane through which the delivery arm 190 pivots.

The delivery rocker arm 190 is disposed immediately above the delivery valve actuation tunnel valve body opening 110d such that the lower-most surface 214 of the second end 210 of the delivery rocker arm 190 rests upon the upper-most portion of the delivery valve actuation tunnel piston 104d and such that the second end 210 of the delivery rocker arm 190 can be pivoted downwardly to urge the delivery valve actuation tunnel piston 104d towards the delivery valve actuation tunnel opening 102d. Thus, by depressing the second end 210 of the delivery rocker arm 190, the outlet opening plug 82d of the delivery valve 34 is moved from the first valve position to the second valve position (thereby opening the delivery valve 34 to liquid flow).

The delivery rocker arm 190 is also disposed proximate to the hydraulic piston 38 in such a way that, when the piston 38 is moved to its upper-most piston position, the piston cup backer 130 engages the downwardly directed element 216 of the first end 208 of the delivery rocker arm 190 so as to pivot the first end 208 of the delivery rocker arm 190 upwardly (and the second end 214 of the delivery rocker arm 190 downwardly).

The delivery valve 34 is also disposed proximate to the starter rocker arm latch 188 in such a way that, when the second end 210 of the delivery rocker arm 190 is pivoted downwardly, the delivery rocker arm flange 218 engages the upper latch body 200 of the starter rocker arm latch 188 and pushes the upper latch body 200 of the starter rocker arm latch 188 away from the starter rocker arm 146 (so that the starter rocker arm 146 clears the lip 202 on the starter rocker arm latch 188 and the second end 158 of the starter rocker arm 146 is free to pivot upwardly).

The delivery rocker arm latch 192 has a lower latch body 220 and an upper latch body 222. The lower latch body 220 is rigidly attached to the delivery valve 34. Like the starter rocker arm latch 188, the upper latch body 222 of the delivery rocker arm latch 192 has a lip 224. The lip 224 has an upper-most surface 226 and a lower-most surface 228. The lower-most surface 226 is adapted to engage the upper-most surface 212 of the second end 210 of the delivery rocker arm 190 (to prevent the second end 210 of the delivery rocker arm 190 from pivoting upwardly). The upper body 222 of the delivery rocker arm latch 192 has sufficient resiliency to allow it to be pushed away from the delivery rocker arm 190 to such an extent that the second end 210 of the delivery rocker arm 190 clears the lip 224 on the upper body 222 of the delivery rocker arm latch 192. The upper-most surface 226 of the delivery rocker arm latch lip 224 and the lower-most surface 214 of the delivery rocker arm 190 are configured with rounded edges so that the downward movement of the delivery rocker arm second end 210 is not prohibited by the lip 224 on the delivery rocker arm latch 192.

The release lever 194 has a first end 230 and a second end 232. The release lever 194 is pivotably attached to a post member 234 which is attached to the bridge body bracket 152. The release lever 194 is attached about a release lever pivot 236 so that it pivots in a vertical plane which is substantially parallel to the vertical plane through which the delivery rocker arm 190 pivots. The first end 230 of the release lever 194 has a lip 238 which has an upper-most surface 240 and a lower-most surface 242. The release lever 194 is disposed proximate to the hydraulic piston 38 in such a way that, when the hydraulic piston 38 is lowered from the upper-most piston position, the top knot 126 of the piston 38 engages the upper surface 240 of the release lever lip 238 to urge the first end 230 of the release lever 194 to pivot downwardly (and the second end 232 of the release lever 194 to pivot upwardly).

The release lever pin 196 is attached to and is disposed normal to the upper body 222 of the delivery rocker arm latch 192. The release lever pin 196 is disposed so that the free end 244 of the delivery latch pin 196 is proximate to the second end 232 of the release lever 194. By this configuration, when the second end 232 of the release lever 194 is pivoted upwardly, the second end 232 of the release lever 194 engages the delivery latch pin 244 and urges the delivery latch pin 244 in a direction away from the hydraulic piston 38. This action pushes the upper body 222 of the delivery rocker arm latch 192 away from the second end 219 of the delivery rocker arm 190 a sufficient distance to cause the lip 224 of the delivery rocker arm latch 192 to become disengaged from the upper-most edge 212 of the delivery rocker arm (allowing the second end 210 of the delivery rocker arm 190 to pivot upwardly).

In a second embodiment of the liquids metering device 16 illustrated in FIGS. 18-24, the liquids metering device 16 comprises (a) the starter valve 32, (b) the hydraulic cylinder 36, (c) the hydraulic piston 38, (d) the sealing means 40 for preventing the escape of liquid between the piston 38 and the walls of the hydraulic cylinder 36, (e) alternate first conduit means for connecting in fluid communication the source of liquids 46 to the starter valve inlet 58s; (f) alternate second conduit means for connecting in fluid communication the starter valve outlet 60s to the cylinder base opening 118 and to a downstream target receptacle (such as a mixing tank 12 or 14), (g) the starter valve manual opening means for opening the starter valve 32 when the base 112 of the hydraulic piston 38 is proximate to the base 114 of the hydraulic cylinder 36, (h) the starter valve linking means 52 for closing the starter valve 32 when the base 112 of the piston 38 is proximate to the upper-most portion of the cylinder 36, and (i) flow restriction means for inhibiting the flow of fluids from the starter valve outlet 60s to the cylinder 36.

As shown in FIGS. 18–24, the alternate first conduit means is provided by conduit 44' which connects the inlet 58s of the starter valve 32 in fluid communication to the source of fluids. As was the case with the first embodiment of the liquids metering device 16, it is preferred that the alternate first conduit means includes a pressure controller 144 to ensure a constant liquid pressure upstream of the starter valve 32.

The alternate second conduit means comprises a main conduit 282 and a branch conduit 284. The main conduit 282 connects the outlet 60s of the starter valve to the target receptacle (which, as stated above, can be a mixing tank 12 or 14 or a diverter valve as described below). The branch conduit 284 connects the main conduit 282 in fluid communication with the cylinder base opening 118.

The flow restriction means can be any of the flow restriction means known to the art. The flow restriction means can be a simple restriction orifice 286 disposed transverse to liquid flow within the branch conduit 284. In a typical embodiment, the area of the restriction orifice 286 is between about 0.0003 and about 0.0032 square inches.

Preferably the branch conduit 284 further comprises a check valve 288 adapted to partially restrict the flow of fluids in the direction from the main conduit 282 to the hydraulic cylinder 36 but to not restrict the flow of fluids in the direction from the hydraulic cylinder 36 to the main conduit 282. The purpose of such a check valve 288 is to provide for a small and controlled flow into the hydraulic cylinder 36 during that phase of the operation when the hydraulic piston 38 is being displaced upwardly within the hydraulic cylinder 36, but to provide for a rapid flow of liquid out of the cylinder 36 and back to the main conduit 282 during that phase of the operation when liquids are being displaced out of the cylinder 36 by the weight of the hydraulic piston 38.

In FIGS. 18–23b, such a check valve 288 is provided by a ball-type check valve wherein flow of fluids towards the hydraulic cylinder 36 induces a ball 290 to nest within the cylinder-proximate valve seat 292 to substantially inhibit fluid flow. Thus, fluid flow towards the cylinder 36 is only possible through the restriction orifice 286. On the other hand, flow of liquids away from the cylinder 36 causes the ball 290 to move to the main conduit-proximate valve seat 294. This main conduit-proximate valve seat 294, however, is adapted with circumferential openings 296 to allow fluids to freely flow around the ball 290 in the direction of the main conduit 282.

Figure 24A:
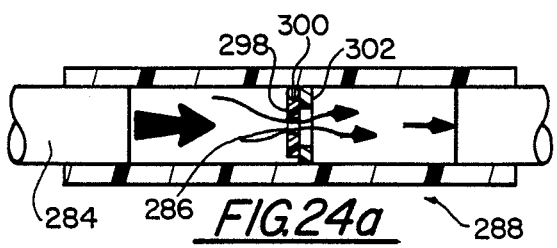
FIG. 24a is a detailed cross-sectional view of a second check valve useful in the invention illustrating the restricted flow of liquids in the direction towards the hydraulic cylinder.
Figure 24B:
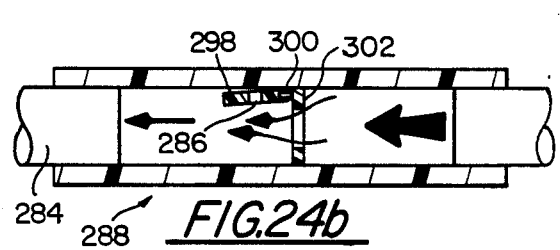
FIG. 24b is a second detailed cross-sectional view of the check valve of FIG. 24a illustrating the relatively unrestricted flow of liquids in the direction away from the hydraulic cylinder.

In an alternative embodiment illustrated in FIGS. 24a and 24b, the check valve 288 is provided by a standard flapper-type check valve adapted to restrict flow of fluids towards the hydraulic cylinder 36. A flapper 298 swivels on a hinge 300 between (i) a position transverse to flow within the branch conduit 284 abutted tightly against an annular ring 302 and (ii) a position parallel to flow within the branch conduit 284.

As illustrated in FIGS. 24a and 24b, the restriction orifice can be conveniently disposed within the check valve flapper 298.

The diverter valve means 18 for accepting a flow of liquid from a pressurized liquid source and directing that flow alternatively between the developer mixing tank 12 and the fixer mixing tank 14 by manipulation of a diverter valve handle 20 can be any of a wide variety of valve/manifold systems. In the embodiment illustrated in the drawings, the diverter valve means 18 comprises a diverter valve 246 disposed within the third conduit means downstream of the liquid metering device 16.

The diverter valve 246 comprises a diverter valve body 248, a diverter valve rotor 250, the diverter valve handle 20 and a diverter valve top cover 254.

The diverter valve body 248 has a base 256 and vertical sides 258. Defined within the base 256 is an inlet port 260 connected in fluid communication to the outlet of the delivery valve, a developer tank outlet port 262 and a fixer tank outlet port 264.

The rotor 250 is a disc with a central hub 265 which is rotatably disposed along the base 256 of the diverter valve body 248. The diverter valve rotor 250 defines a diverter valve rotor opening 266 which can alternatively be positioned between (i) a first diverter valve position wherein liquid is allowed to flow from the inlet port 260 to the developer tank outlet port 262 and (ii) a second diverter valve position wherein liquid is allowed to flow between the inlet port 260 and the fixer tank outlet port 264. The diverter valve rotor 250 is configured so that, when the diverter valve rotor 250 is in the first diverter valve position, liquid is prevented from flowing from the inlet port 260 to the fixer tank outlet port 264, and, when the diverter valve rotor 250 is in the second diverter valve position, liquid is prevented from flowing from the inlet port 260 to the developer tank outlet port 262. The rotor 250 is sealed against the base 256 of the diverter valve body 258 by one or more O-rings 267.

The diverter valve handle 20 is attached to the free end of the diverter valve rotor hub 265 and is disposed parallel to the diverter valve rotor 250. By this configuration, the manipulation of the diverter valve handle 20 rotates the diverter valve rotor hub 265 and causes the rotation of the diverter valve rotor 250 between the first diverter valve position and the second diverter valve position.

The diverter valve 246 is conveniently housed within a diverter valve housing cover 266 disposed bridging the top covers 24 of the developer tank 12 and the mixing tank 14. In the embodiment illustrated in the drawings, the diverter valve cover 266 comprises two oppositely-disposed end walls 268, two oppositely-disposed side walls 270 and a top wall 272.

The metered liquid conduit means 21 for attaching the liquids metering means in fluid communication with the diverter valve means 18 can be any suitable conduit (pipe, tubing, hose, etc.). The metered liquid conduit means 21 attaches the outlet of the delivery valve 34 in fluid communication with the diverter valve inlet port 218.

Figure 25:
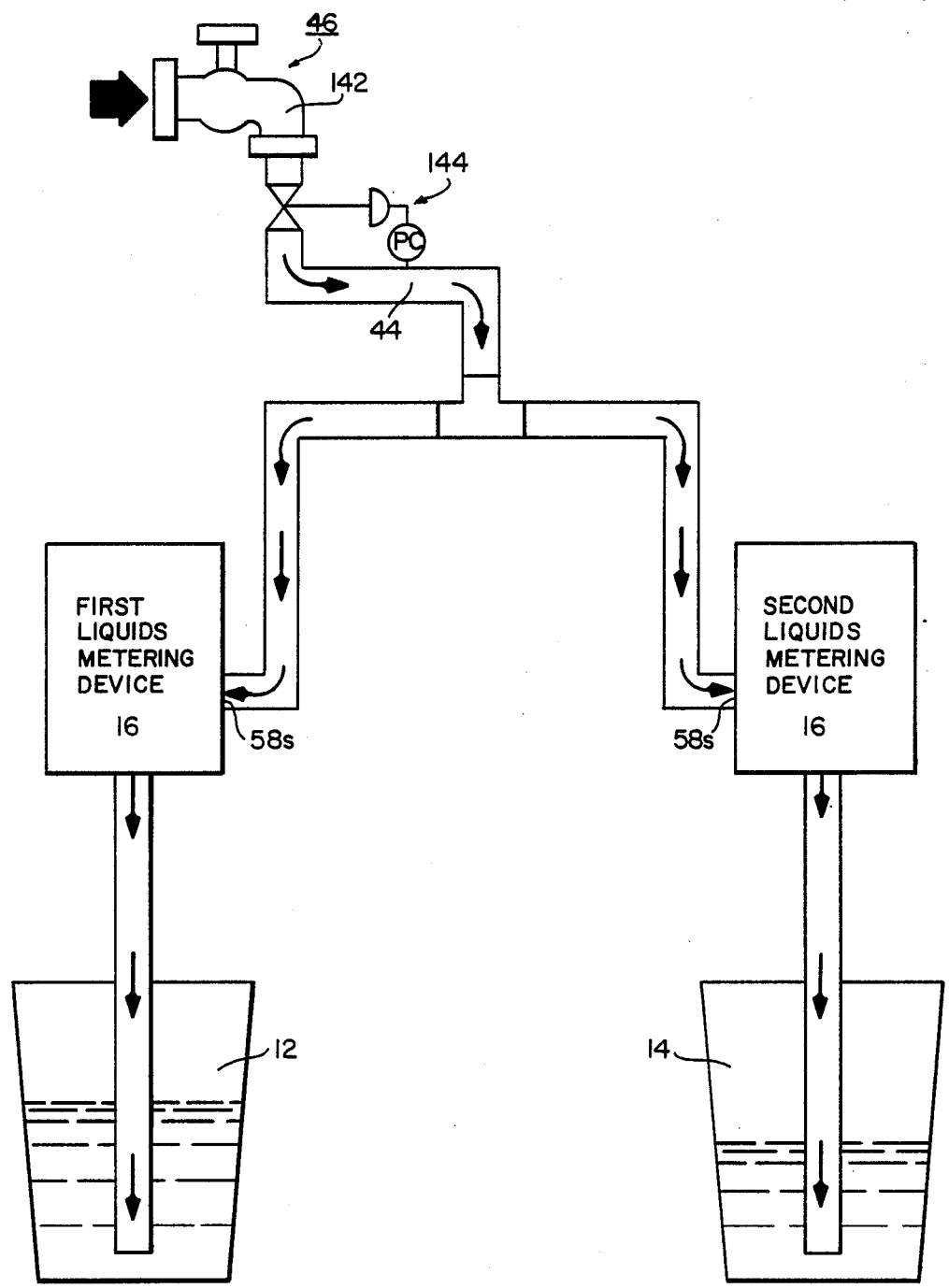
FIG. 25 is a liquids flow diagram illustrating in diagrammatic form the flow of liquids through an alternative embodiment of the x-ray solution mixing machine wherein two liquids metering devices are employed, one disposed relative to each mixing tank.

In the alternative embodiment illustrated in FIG. 25 wherein two liquids metering devices 16 are employed (one used with each tank 12 and 14), the starter valve inlets 58s of both liquids metering devices 16 are manifolded into conduit 44 downstream of the pressure controller 144.

The slide member 22 can be any mechanical element capable of alternatively (i) blocking the insertion of a mixing solution reactant into one of the developer tank top cover openings 28d and (ii) blocking the insertion of a fixer solution reactant into the fixer tank top cover openings 28f. In the embodiment illustrated in the drawings, the slide member 22 is a simple T-shaped element slidably attached within the diverter valve cover 266 such that the slide member 22 slides within slide member openings 274 in the side walls 270 of the diverter valve cover 266 between (i) a first slide member position wherein the slide member 22 partially covers at least one of the fixer tank top cover openings 28f and (ii) a second slide member position wherein the slide member 22 partially covers at least one of the developer tank top cover openings 28d.

The slide member linking means for connecting the slide member 22 to the diverter valve handle 20 can be any suitable mechanical means capable of connecting the slide member 22 to the diverter valve handle 20 in such a way that the moving of the slide member 22 to the first slide member position manipulates the diverter valve handle 20 to cause the diverter valve rotor 250 to move to the first diverter valve position, and the moving of the slide member 22 to the second slide member position manipulates the diverter valve handle to divert the flow of fluids to the developer tank. In the embodiment of the invention illustrated in the drawings, the slide member linking means 24 is a simple slide member linking means pin 276 about which the slide member 22 pivots via link pin hole 278 defined in the crosspiece 280 of the slide member 22. The slide member linking means pin 276 is slidably attached to the diverter valve handle in a slit 282.

Figure 1:
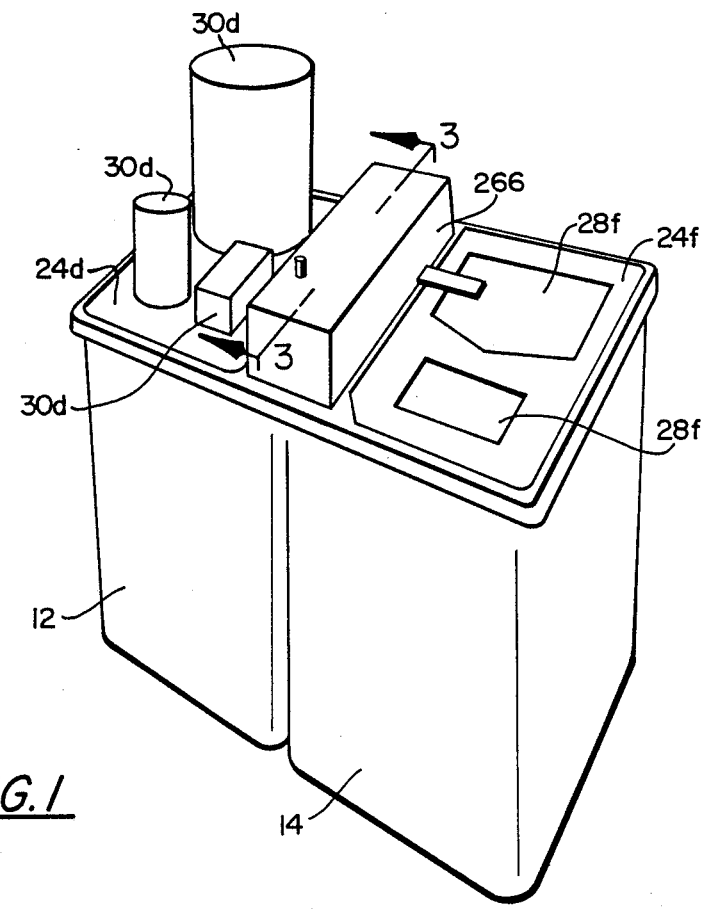
FIG. 1 is a perspective view of an x-ray solution mixing machine having features of the invention.
Figure 2:
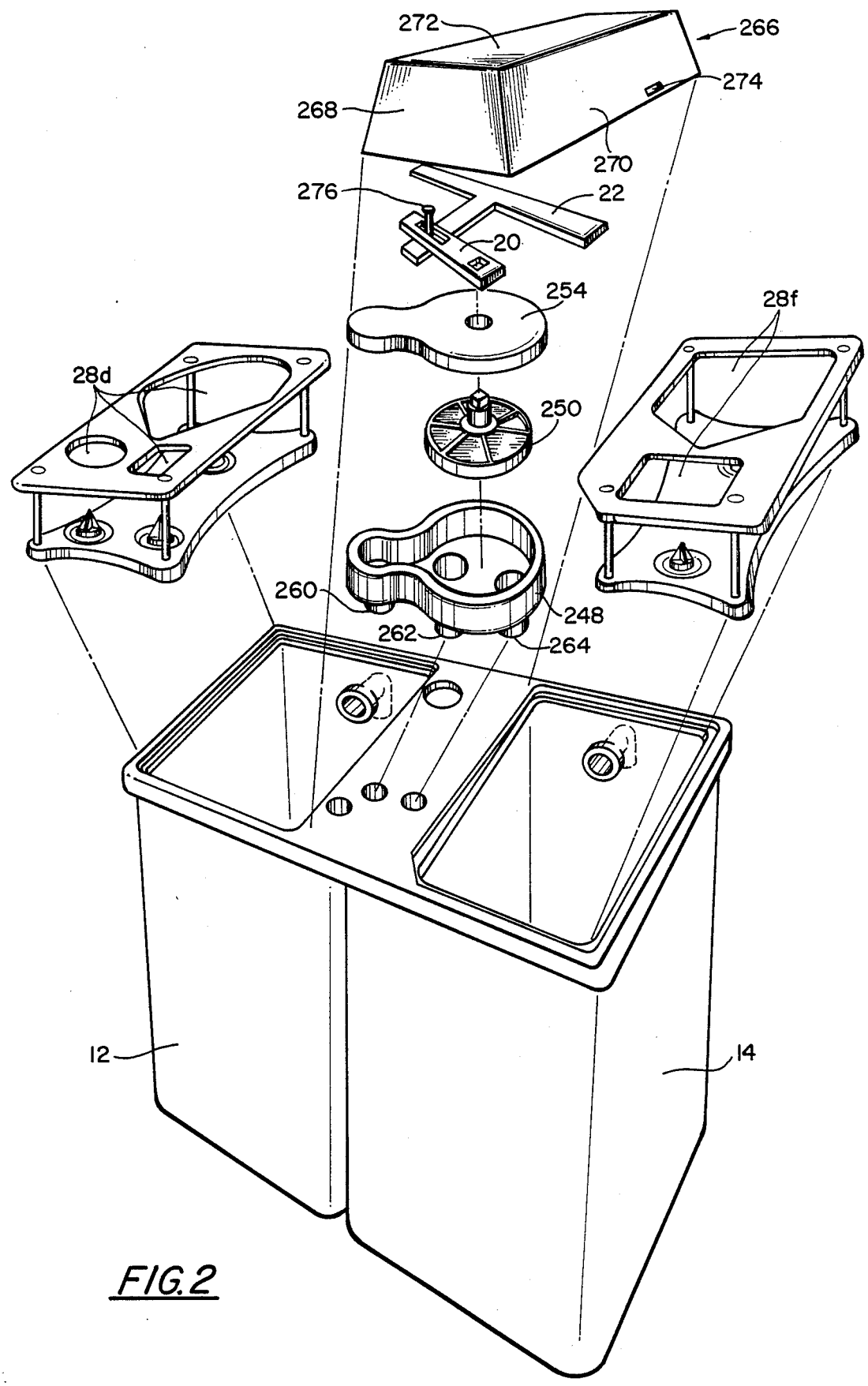
FIG. 2 is a partially exploded perspective view of the x-ray solution mixing machine of FIG. 1.

In a typical operation using the liquids metering device embodiment illustrated in FIGS. 1–17, where an operator wishes to prepare, for example, an x-ray developer solution, the slide member 22 is first moved to the first slide member position as shown in FIG. 1. This exposes the developer tank top cover openings 28d and blocks one or more of the fixer tank openings 28f. It also manipulates the diverter valve handle 20 to direct flow from the delivery valve 34 of the liquids metering device 16 to the developer tank 12.

The operator then discharges the pre-measured developer reactants into the developer tank 12 by inverting the shaped developer reactant containers 30d into the developer tank top cover openings. Puncture points 284 disposed in the developer tank 12 below each of the developer tank top cover openings 28d, puncture any foil seal disposed over the mouths of the reactant containers 30d allowing the reactants to flow out.

The starter button 170 is then depressed. This action depresses the center bolt 178 which, in turn, depresses the trigger slide 174 downwardly along the slide bolts 176. As the trigger slide 174 is moved downwardly, the trigger 172 contacts the second end 166 of the trigger arm 148 and depresses it downwardly as shown in FIG. 13. The starter button 170 is released, allowing the trigger 172, trigger slide 174, center bolt 178 and starter button 170 to move back upwardly to the original starter button position under the urging of the starter button spring 180.

As the second end 166 of the trigger arm 148 is depressed downwardly, the flange element 168 on the second end 166 of the trigger arm 148 engages the upper surface 160 of the starter rocker arm 146 and depresses it downwardly to where it is engaged and held down by the lip 202 on the upper body 200 of the starter rocker arm latch 188 as shown in FIG. 9. As the starter rocker arm 146 is depressed downwardly, the lower-most edge 162 of the starter rocker arm 146 impinges upon the starter valve actuation tunnel piston 104s and pushes the actuation tunnel piston 104s towards the actuation tunnel opening 102s. By this action, the outlet opening 100s in the starter valve 32 is moved from the closed valve position to the open valve position and water is allowed to flow through the pressure regulator 144, through the starter valve 32 and into the hydraulic cylinder 36 via the cylinder base opening 118.

As the water flows into the hydraulic cylinder 36, the hydraulic piston 38 is moved upwardly from the lower-most piston position towards the upper-most piston position as shown in FIG. 9A. (While the piston 38 is being moved upwardly, a small, but inconsequential amount of water is dribbled out of the cylinder 36 via the bleed pipe 134.)

Figure 6:
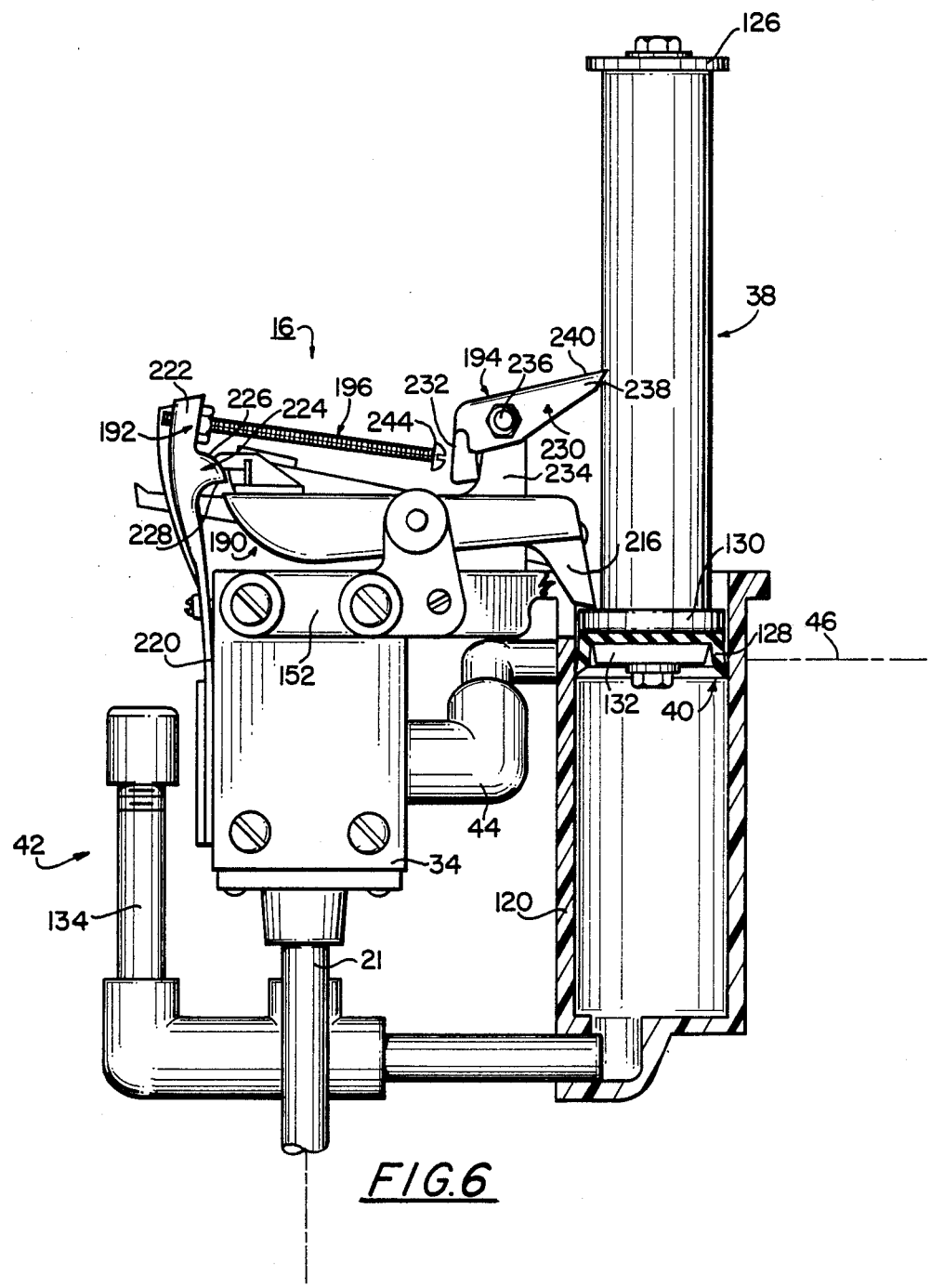
FIG. 6 is an opposite side view of the liquids metering device of FIG. 5. The hydraulic cylinder is shown in cross-section.

As the hydraulic piston 38 approaches the upper-most piston position, the piston cup backer 130 contacts the downwardly directed element 216 on the first end 208 of the delivery rocker arm 190, causing the first end 208 of the delivery rocker arm 190 to pivot upwardly. This is shown in FIGS. 6 and 9B. As the first end 208 of the delivery rocker arm is pivoted upwardly, the second end of the delivery rocker arm 190 is pivoted downwardly until it is engaged beneath the lip 224 on the upper latch body 222 of the delivery rocker arm latch 192.

As the second end 210 of the delivery rocker arm 190 is pivoted downwardly, the lower-most surface 214 of the delivery rocker arm 190 contacts the actuation tunnel piston 104d in the delivery valve 34 and moves it downwardly towards the actuation tunnel opening 102d. By this action, the outlet opening plug 82d in the delivery valve 34 is caused to move from the closed valve position to the open valve position, thereby allowing water to flow from the pressure regulator 144, through the delivery valve 34 and into the inlet port 260 of the diverter valve 246. Because the slide member 22 is in the first slide member position, the water entering the diverter valve 246 via the diverter valve inlet port 260 is directed out of the diverter valve 246 and into the developer tank 12 via the developer tank outlet port 262.

Figure 14:
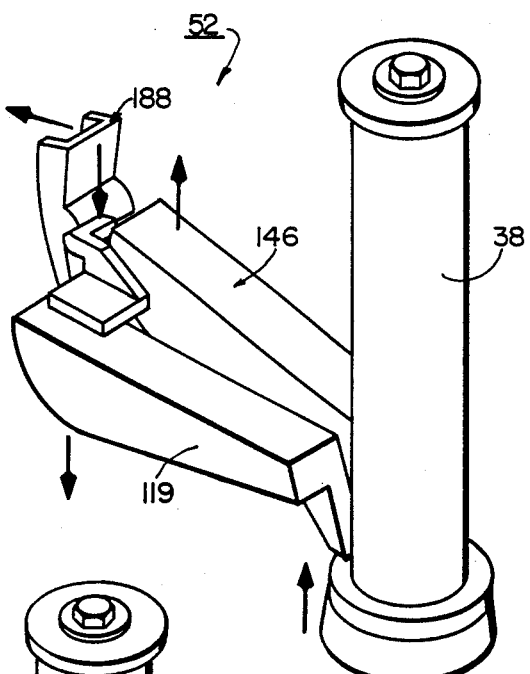
FIG. 14 is a perspective view of a starter valve linking means for closing the starter valve (when the base of the piston is proximate to the upper-most portion of the cylinder) useful in the invention.
Figure 15:
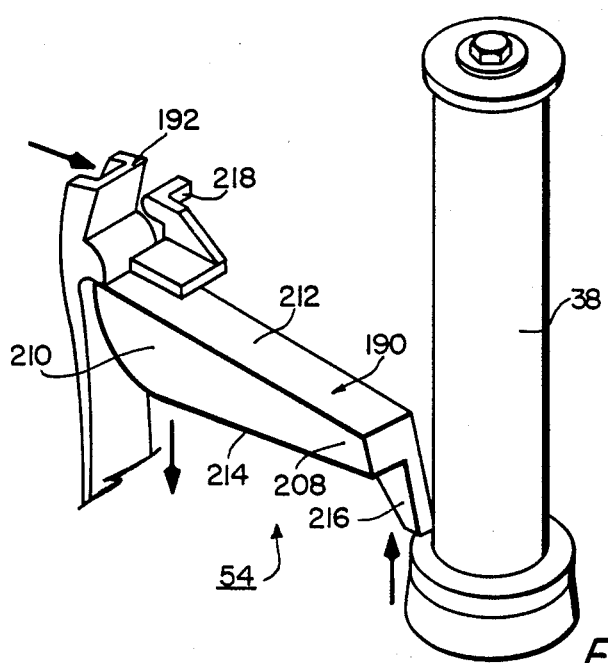
FIG. 15 is a perspective view of a delivery valve first linking means for opening the delivery valve (when the base of the hydraulic piston is proximate to the upper-most portion of the hydraulic cylinder) useful in the invention.
Figure 16:
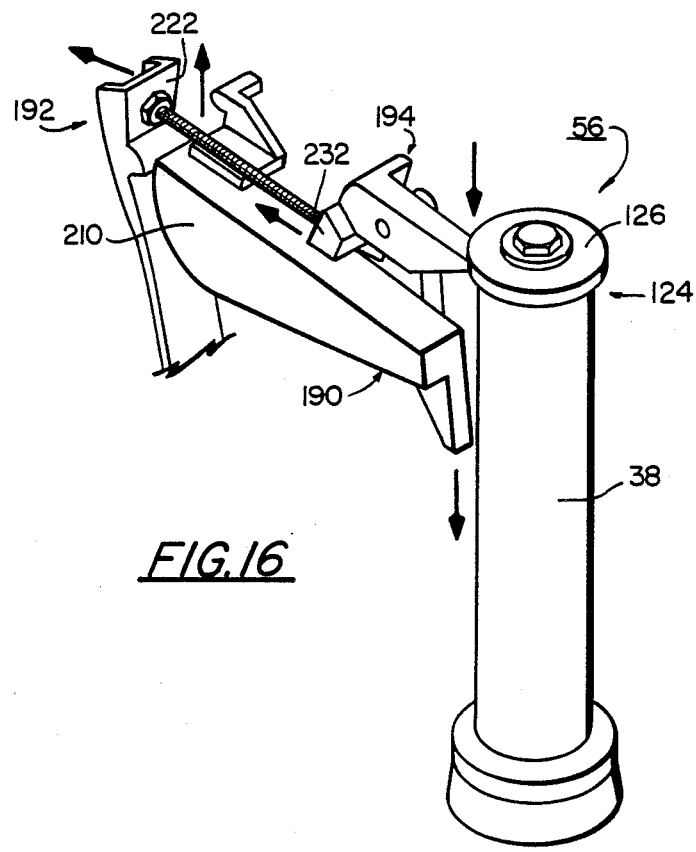
FIG. 16 is a perspective view of a delivery valve second linking means for closing the delivery valve (when the base of the hydraulic piston is proximate to the base of the hydraulic cylinder) useful in the invention.

As the second end 210 of the delivery rocker arm 190 is pivoted downwardly, the delivery rocker arm flange 218 on the second end 210 of the delivery rocker arm 190 is caused to impinge upon the starter rocker arm latch 188 pushing it away from the second end 158 of the starter rocker arm 146 a sufficient distance so that the upward pivoting of the second end 158 of the starter rocker arm 146 is no longer impeded by the lip 202 on the starter rocker arm latch 188. This is shown in FIGS. 9B and 14. Thereupon, the pressure exerted upon the starter valve actuation tunnel piston 104s urges the starter valve actuation tunnel piston 104s upwardly, thereby moving the starter valve outlet plug 82s from the open valve position to the closed valve position. When the starter valve outlet plug 82s goes to the closed valve position, water no longer flows through the starter valve 32. Consequently, there no longer is a flow of water into the hydraulic cylinder 36. Because of the open bleed pipe 134, the weight of the piston 38 causes water within the hydraulic cylinder 36 to be expelled out of the cylinder 38 via the bleed pipe outlet port 138 as shown in FIG. 9C. Accordingly, the hydraulic piston 38 begins a slow descent from the upper-most piston position towards the lower-most piston position. In a typical embodiment this descent takes between about 60 and about 90 seconds.

As the piston 38 approaches the lower-most piston position, the top knot 126 on the top 124 of the piston 38 contacts the first end 230 of the release lever 194 and causes the first end 230 of the release lever 194 to pivot downwardly. As the first end 230 of the release lever 194 pivots downwardly, the second end 232 of the release lever 194 is caused to pivot upwardly. As the second end 232 of the release lever 194 pivots upwardly, it contacts the release lever pin 196 and pushes against the pin 196, thereby pushing the upper body 222 of the delivery rocker arm latch 192 away from the second end 210 of the delivery rocker arm 190 so that the second end 210 of the delivery rocker arm 190 is free to pivot upwardly. This allows the actuation tunnel piston 104d in the delivery valve 34 to move upwardly (because of pressure in the delivery valve chamber 74d), so as to cause the outlet opening plug 82d in the delivery valve 34 to move from the open valve position to the closed valve position. By this movement, the water flow through the delivery valve 34 is stopped.

In a typical operation using the alternative liquids metering device embodiment illustrated in FIGS. 18–24, the steps from the operator's point of view are the same. The manual opening means is used to open flow through the starter valve 32. Most of this flow proceeds directly to the diverter valve 246 while a controlled portion is taken off via the branch conduit 284 and flows via the restriction orifice 286 into the hydraulic cylinder 36. This flow into the hydraulic cylinder 36 displaces the hydraulic piston 38 upwardly. The flow continues through the starter valve 32 until the hydraulic piston 38 reaches the upper-most piston position whereupon the starter valve linking means 52 causes the starter valve 32 to close. The quantity of flow to the diverter valve 246 during this operation is accurate and reproducible because the period of time required to displace the hydraulic piston 36 from the lower-most piston position to the upper-most piston position is controlled and reproducible.

As can be seen from the foregoing, the preparation of an x-ray mixing solution is almost fully automatic. The operator need only choose which kind of x-ray solution he or she wishes to prepare. The operator moves the slide member 22 to expose the tank top opening 28 in the appropriate mixing tank. The movement of the slide member 22 automatically sets the diverter valve 246 to allow water to flow into the proper mixing tank. The operator then adds the pre-measured mixing solution reactants by inverting the solution mixing reactant containers in the shaped openings 28 in the mixing tank cover 24. Thereafter, the operator need only push the starter button 170. Because of its simple construction and operation, the period of time required for the hydraulic piston 38 to travel from one position in the hydraulic cylinder 36 to the other is highly reproducible. Because of this, the quantity of water allowed to flow from downstream of the pressure regulator 144 to the mixing tank 12 or 14 is highly reproducible. What is more, that quantity of water is easily adjustable by adjustment of the several parameters affecting water flow through the system.

As can be further seen from the foregoing, the invention provides a simple, accurate and efficient way to prepare x-ray mixing solutions without use of equipment dependent upon electronic components.

Although the present invention has been described in considerable detail with reference to certain preferred versions, other versions are possible. Therefore, the spirit and scope of the appended claims should not necessarily be limited to the description of the preferred versions contained herein.

I claim:

1. A liquids metering device comprising:
   (a) a first valve having a first valve inlet, a first valve outlet, and a first valve throat which connects the first valve inlet and the first valve outlet in fluid communication, the first valve also having a first valve closure means for alternatively opening and closing the first valve to liquid flow;
   (b) a second valve having a second valve inlet, a second valve outlet, and a second valve throat which connects the second valve inlet and the second valve outlet in fluid communication, the second valve also having a second valve closure means for alternatively opening and closing the second valve to liquid flow;
   (c) a vertical hydraulic cylinder having a cylinder base and cylinder sides, the cylinder also having a cylinder base opening disposed proximate to the cylinder base to allow liquids to flow into and out of the cylinder;
   (d) a hydraulic piston disposed within the hydraulic cylinder such that the hydraulic piston is capable of sliding up and down within the hydraulic cylinder between a lower-most piston position which is above the cylinder base opening and an upper-most piston position;
   (e) sealing means for preventing the escape of liquid from between the hydraulic piston and the walls of the cylinder;
   (f) bleed means for allowing a controlled rate of liquid to flow out of the hydraulic cylinder;
   (g) first conduit means for connecting in fluid communication a source of liquids to the inlets of the first and second valves;
   (h) second conduit means for connecting in fluid communication the outlet side of the first valve to the cylinder base opening;
   (i) first valve manual opening means for opening the first valve when the hydraulic piston is proximate to the lower-most piston position;
   (j) first valve linking means for closing the first valve when the hydraulic piston is proximate to the upper-most piston position;
   (k) second valve first linking means for opening the second valve when the hydraulic piston is proximate to the upper-most piston position; and
   (l) second valve second linking means for closing the second valve when the hydraulic piston is proximate to the lowermost piston position; wherein the bleed means is chosen so that, when the cylinder is filled with liquid with the piston in its upper-most position and the first valve is then closed to liquid flow, the weight of the piston evacuates the liquid from the cylinder in a controlled and reproducible time period.

2. The liquids metering device of claim 1 wherein the first valve and the second valve each comprise:
   (a) a chamber defining (i) an inlet opening, (ii) an outlet opening and (iii) an actuation tunnel opening, the outlet opening and the actuation tunnel opening being disposed on opposite sides of the chamber;
   (b) an actuation tunnel having an interior wall surface and disposed in fluid communication with the actuation tunnel opening;
   (c) an actuation tunnel plug slidably disposed within the actuation tunnel;

(d) sealing means for preventing the flow of fluids between the actuation tunnel plug and the interior wall surface of the actuation tunnel;

(e) an outlet opening plug disposed outside of the chamber proximate to the outlet opening and adapted to move between a closed valve position wherein the outlet opening plug seals the outlet opening and an open valve position wherein the outlet opening plug does not seal the outlet opening;

(f) a linking pin for connecting the actuation tunnel plug with the outlet opening plug in such a way that when the actuation plug is moved away from the actuation tunnel opening, the outlet opening plug is moved toward the closed valve position, and when the actuation tunnel plug is moved toward the actuation tunnel opening, the outlet opening plug is moved away from the closed valve position; and (g) manipulating means for moving the actuation tunnel plug towards the actuation tunnel opening; wherein the actuation tunnel plug has an internal cross-sectional area which is greater than the area of the outlet opening plug normal to the direction of fluid flow through the outlet opening, and wherein the linking pin is long enough so that the outlet opening plug can move between the closed valve position and the open valve position, and short enough so that fluid pressure within the chamber causes the outlet opening plug to move to the closed valve position.

3. The liquids metering device of claim 2 wherein the actuation tunnel plug in the first valve protrudes to the exterior of the first valve and wherein the first valve manual opening means for opening the first valve when the hydraulic piston is proximate to the lower-most piston position comprises:

(a) a first rocker arm having a first and a second end and being pivotally mounted proximate to the first valve in such a way that the first rocker arm pivots between a first first rocker arm pivot position and a second first rocker arm pivot position;

(b) trigger means for pivoting the second end of the first rocker arm to the second first rocker arm pivot position whereby the second end of the first rocker arm contacts the end of the actuation tunnel plug least proximate to the actuation tunnel opening and urges the actuation tunnel plug toward the actuation tunnel opening; and (c) first rocker arm latch means for alternatively (i) securing the first rocker arm in the second first rocker arm position and (ii) releasing the first rocker arm from the second first rocker arm position.

4. The liquids metering device of claim 3 wherein the trigger means comprises:

(a) trigger which is slidably affixed proximate to the first valve; and (b) a trigger arm having a first end and a second end and being pivotably affixed proximate to the first rocker arm in such a way that the pivoting of the second end of the trigger arm causes the second end of the trigger arm to make initial contact with the second end of the first rocker arm and urge the second end of the first rocker arm to pivot in the first radial direction; wherein the trigger is slidably disposed in relationship to the trigger arm such that the trigger slides in a single linear direction between a first trigger position wherein the trigger is initially not in contact with the trigger arm, a second trigger position wherein the trigger is in contact with the trigger arm, and a third trigger position wherein the trigger is again not in contact with the trigger arm.

5. The liquids metering device of claim 4 wherein the first valve linking means for closing the first valve when the hydraulic piston is proximate to the upper-most piston position comprises a second rocker arm having a first end and a second end and is pivotally mounted proximate to the first rocker arm in such a way that the second rocker arm pivots between a first second rocker arm position and a second second rocker arm position, the first end of the second rocker arm having a downwardly directed projection member disposed proximate to the hydraulic cylinder in such a way that when the hydraulic piston approaches the upper-most piston position the base of the piston makes contact with the projection member and pivots the second rocker arm to the second second rocker arm position, the first end of the second rocker arm having a lateral member disposed proximate to the first rocker arm latch means in such a way that when the second rocker arm is pivoted to the second second rocker arm position the lateral member urges the first rocker arm latch means to release the first rocker arm from the second first rocker arm position.

6. The liquid metering device of claim 5 wherein the actuation tunnel plug in the second valve protrudes to the exterior of the second valve and wherein the second valve first linking means for opening the second valve when the hydraulic piston is proximate to the upper-most piston position comprises a second rocker arm latch means for alternatively (i) securing the second rocker arm in the second rocker arm position and (ii) releasing the second rocker arm from the second second rocker arm position, wherein the second rocker arm is secured proximate to the second valve so that when the second rocker arm is in the second second rocker arm position the second end of the second rocker arm contacts the end of the second valve actuation tunnel plug least proximate to the actuation tunnel opening and urges the second valve actuation tunnel toward the actuation tunnel opening.

7. The liquids metering device of claim 6 wherein the second valve second linking means for closing the second valve when the hydraulic piston is proximate to the lower-most piston position comprises:

(a) a release lever having a first end and a second end and pivotally disposed proximate to the hydraulic cylinder in such a way that when the hydraulic piston approaches the lower-most piston position, the top of the piston contacts the first end of the release lever and causes the release lever to pivot from a first release lever pivot position to a second release lever pivot position; and (b) a release lever pin disposed proximate to the second end of the release lever in such a way that when the release lever is caused to pivot to the second release lever pivot position, the release lever pin causes the second rocker arm latch means to release the second rocker arm from the second second rocker arm position.

8. The liquids metering device of claim 1 wherein the hydraulic cylinder has an internal diameter between about 1 and about 3 inches and is between about 3 and about 7 inches long.

9. The liquids metering device of claim 1 wherein the hydraulic piston is between about 25 and about 50 ounces in weight and is between about 5 and about 9 inches long.

10. The liquids metering device of claim 1 wherein the bleed means for allowing a controlled rate of liquid to flow out of the hydraulic cylinder comprises an outlet port or a flow restriction orifice having a diameter between about 1/32 and about 1/8 inches.

11. The liquids metering device of claim 1 wherein the first conduit means for connecting in fluid communication a source of liquids to the inlets of the first and second valves comprises a pressure regulator.

12. The liquids metering device of claim 1 wherein when the hydraulic cylinder is filled with liquid so that the hydraulic piston is at the upper-most piston position, and when the first valve is in the closed valve position, the piston travels from the upper-most piston position to the lower-most piston position in a period of between about 60 and about 90 seconds.

13. The liquids metering device of claim 1 wherein the bleed means for allowing a controlled rate of liquid to flow out of the hydraulic cylinder is adjustable.

14. The liquids metering device of claim 1 wherein the bleed means for allowing a controlled rate of liquid to flow out of the hydraulic cylinder comprises an outlet port and wherein an outlet port plug is attached proximate to the outlet port in such a way that the outlet port plug can be adjustably moved closer to or farther away from the outlet port to adjust the flow rate of liquids flowing through the outlet port.

15. A liquids metering device comprising:
(a) a first valve having a first valve inlet, a first valve outlet, and a first valve throat which connects the first valve inlet and the first valve outlet in fluid communication, the first valve also having a first valve closure means for alternatively opening and closing the first valve to liquid flow;
(b) a second valve having a second valve inlet, a second valve outlet, and a second valve throat which connects the second valve inlet and the second valve outlet in fluid communication, the second valve also having a second valve closure means for alternatively opening and closing the second valve to liquid flow; wherein the first valve and the second valve each comprise:
  (I) a chamber defining (i) an inlet opening, (ii) an outlet opening and (iii) an actuation tunnel opening, the outlet opening and the actuation tunnel opening being disposed on opposite sides of the chamber;
  (II) an actuation tunnel having an interior wall surface and disposed in fluid communication with the actuation tunnel opening;
  (III) an actuation tunnel plug slidably disposed within the actuation tunnel and protruding to the exterior of the valve;
  (IV) sealing means for preventing the flow of fluids between the actuation tunnel plug and the interior wall surface of the actuation tunnel;
  (V) an outlet opening plug disposed outside of the chamber proximate to the outlet opening and adapted to move between a closed valve position wherein the outlet opening plug seals the outlet opening and an open valve position wherein the outlet opening plug does not seal the outlet opening;
  (VI) a linking pin for connecting the actuation tunnel plug with the outlet opening plug in such a way that when the actuation plug is moved away from the actuation tunnel opening, the outlet opening plug is moved toward the closed valve position, and when the actuation tunnel plug is moved toward the actuation tunnel opening, the outlet opening plug is moved away from the closed valve position; and
  (VII) manipulating means for moving the actuation tunnel plug towards the actuation tunnel opening; wherein the actuation tunnel plug has an internal cross-sectional area which is greater than the area of the outlet opening plug normal to the direction of fluid flow through the outlet opening, and wherein the linking pin is long enough so that the outlet opening plug can move between the closed valve position and the open valve position, and short enough so that fluid pressure within the chamber causes the outlet opening plug to move to the closed valve position;
(c) a vertical hydraulic cylinder having a cylinder base and cylinder sides, the cylinder also having a cylinder base opening disposed proximate to the cylinder base to allow liquids to flow into and out of the cylinder, the hydraulic cylinder having an internal diameter between about 1 and about 3 inches and a length between about 3 and about 7 inches;
(d) a hydraulic piston disposed within the hydraulic cylinder such that the hydraulic piston is capable of sliding up and down within the hydraulic cylinder between a lower-most piston position which is above the cylinder base opening and an upper-most piston position, the hydraulic piston being between about 25 and about 50 ounces in weight and between about 5 and about 9 inches in length.
(e) sealing means for preventing the escape of liquid from between the hydraulic piston and the walls of the cylinder;
(f) bleed means for allowing a controlled rate of liquid to flow out of the hydraulic cylinder comprising an outlet port or a flow restriction orifice having a diameter between about 1/32 and about ⅛ inches;
(g) first conduit means for connecting in fluid communication a source of liquids to the inlets of the first and second valves, such first conduit means comprising a pressure regular;
(h) second conduit means for connecting in fluid communication the outlet side of the first valve to the cylinder base opening;
(i) first valve manual opening means for opening the first valve when the hydraulic piston is proximate to the lower-most piston position comprising:
  (I) a first rocker arm having a first and a second end and being pivotally mounted proximate to the first valve in such a way that the first rocker arm pivots between a first first rocker arm pivot position and a second first rocker arm pivot position;
  (II) trigger means for pivoting the second end of the first rocker arm to the second first rocker arm pivot position whereby the second end of the first rocker arm contacts the end of the actuation tunnel plug least proximate to the actuation tunnel opening and urges the actuation tunnel plug toward the actuation tunnel opening; and (III) first rocker arm latch means for alternatively (i) securing the first rocker arm in the second first rocker arm position and (ii) releasing the first rocker arm from the second first rocker arm position;

(j) first valve linking means for closing the first valve when the hydraulic piston is proximate to the upper-most piston position comprising a second rocker arm having a first end and a second end and is pivotally mounted proximate to the first rocker arm in such a way that the second rocker arm pivots between a first second rocker arm position and a second second rocker arm position, the first end of the second rocker arm having a downwardly directed projection member disposed proximate to the hydraulic cylinder in such a way that when the hydraulic piston approaches the upper-most piston position the base of the piston makes contact with the projection member and pivots the second rocker arm to the second second rocker arm position, the first end of the second rocker arm having a lateral member disposed proximate to the first rocker arm latch means in such a way that when the second rocker arm is pivoted to the second second rocker arm position the lateral member urges the first rocker arm latch means to release the first rocker arm from the second first rocker arm position;

(k) second valve first linking means for opening the second valve when the hydraulic piston is proximate to the upper-most piston position comprising a second rocker arm latch means for alternatively (i) securing the second rocker arm in the second rocker arm position and (ii) releasing the second rocker arm from the second second rocker arm position, wherein the second rocker arm is secured proximate to the second valve so that when the second rocker arm is in the second second rocker arm position the second end of the second rocker arm contacts the end of the second valve actuation tunnel plug least proximate to the actuation tunnel opening and urges the second valve actuation tunnel toward the actuation tunnel opening; and (1) second valve second linking means for closing the second valve when the hydraulic piston is proximate to the lower-most piston position comprising:

(I) a release lever having a first end and a second end and pivotally disposed proximate to the hydraulic cylinder in such a way that when the hydraulic piston approaches the lower-most piston position, the top of the piston contacts the first end of the release lever and causes the release lever to pivot from a first release lever pivot position to a second release lever pivot position; and (II) a release lever pin disposed proximate to the second end of the release lever in such a way that when the release lever is caused to pivot to the second release lever pivot position, the release lever pin causes the second rocker arm latch means to release the second rocker arm from the second second rocker arm position; wherein the bleed means is chosen so that, when the cylinder is filled with liquid with the piston in its upper-most position and the first valve is then closed to liquid flow, the weight of the piston evacuates the liquid from the cylinder in a controlled and reproducible time period; and wherein when the hydraulic cylinder is filled with liquid so that the hydraulic piston is at the upper-most piston position, and when the first valve is in the closed valve position, the piston travels from the upper-most piston position to the lower-most piston position in a period of between about 60 and about 90 seconds.

* * * * *